(12) United States Patent
Kawamura et al.

(10) Patent No.: US 10,133,085 B2
(45) Date of Patent: Nov. 20, 2018

(54) ZOOM LENS WITH BLUR CORRECTION AND IMAGE PICKUP APPARATUS USING THE SAME

(71) Applicant: OLYMPUS CORPORATION, Tokyo (JP)

(72) Inventors: Kazuteru Kawamura, Tokyo (JP); Yasuharu Yamada, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 173 days.

(21) Appl. No.: 15/086,492

(22) Filed: Mar. 31, 2016

(65) Prior Publication Data

US 2016/0349531 A1 Dec. 1, 2016

(30) Foreign Application Priority Data

May 29, 2015 (JP) ................ 2015-109484

(51) Int. Cl.
| | | |
|---|---|---|
| *G02B 27/64* | (2006.01) | |
| *G02B 15/173* | (2006.01) | |
| *G02B 9/60* | (2006.01) | |
| *G02B 15/16* | (2006.01) | |

(52) U.S. Cl.
CPC ......... *G02B 27/646* (2013.01); *G02B 15/173* (2013.01); *G02B 9/60* (2013.01); *G02B 15/16* (2013.01)

(58) Field of Classification Search
CPC .......... G02B 9/34; G02B 9/60; G02B 13/004; G02B 13/0045; G02B 15/14; G02B 15/16; G02B 15/163; G02B 15/173; G02B 15/20; G02B 15/22; G02B 15/24; G02B 15/28; G02B 27/64; G02B 27/646

USPC ....... 359/676, 683, 684, 686, 687, 694, 695, 359/754, 763, 764, 766, 771, 772, 773, 359/774, 554, 557

See application file for complete search history.

(56) References Cited

U.S. PATENT DOCUMENTS

| | | | | |
|---|---|---|---|---|
| 7,336,426 B2* | 2/2008 | Nakatani | ............. | G02B 15/173 359/557 |
| 2011/0122506 A1* | 5/2011 | Ito | ......................... | G02B 15/173 359/683 |
| 2011/0261232 A1* | 10/2011 | Touchi | ................. | G02B 15/173 348/240.3 |
| 2012/0113516 A1* | 5/2012 | Kimura | ................ | G02B 15/173 359/557 |

FOREIGN PATENT DOCUMENTS

JP 2012-141555 7/2012

* cited by examiner

*Primary Examiner* — Arnel C Lavarias
(74) *Attorney, Agent, or Firm* — Hunton Andrews Kurth LLP

(57) ABSTRACT

A zoom lens includes in order from an object side, a first lens unit having a positive refractive power, a second lens unit having a negative refractive power, a third lens unit having a positive refractive power, and a first lens component in the predetermined lens unit moves perpendicularly with respect to an optical axis and is fixed at the time of zooming, and a second lens component is disposed, leaving an air space on an image side of the first lens component, and a sign of a refractive power of the second lens component differs from a sign of a refractive power of the first lens component, and the following conditional expression (1) is satisfied.

$$3.4 \le |f_1/f_3| \le 9 \qquad (1)$$

54 Claims, 12 Drawing Sheets

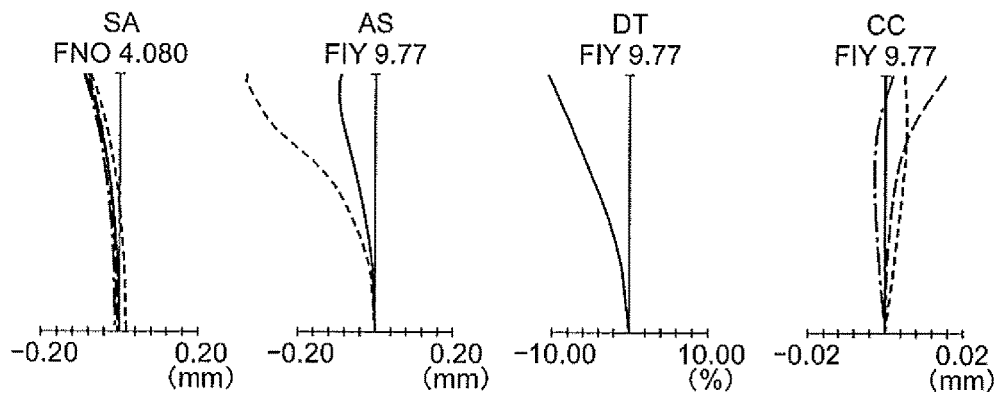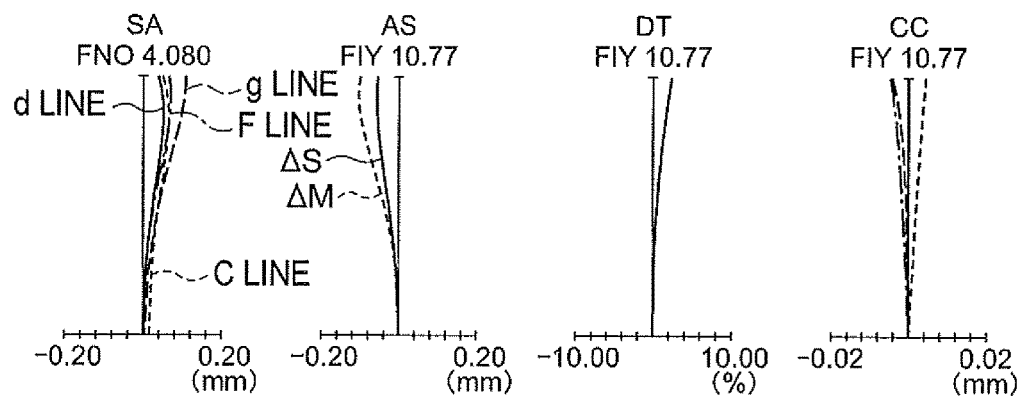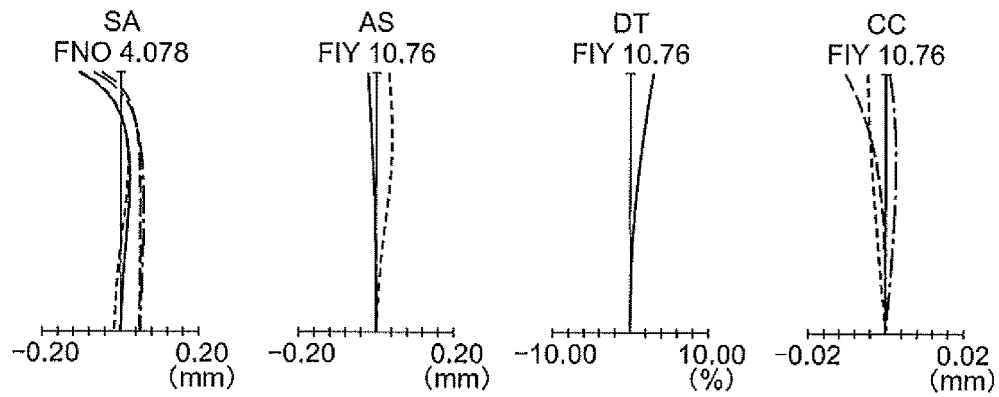

SA
FNO 4.080
-0.20  0.20
(mm)

AS
FIY 9.73
-0.20  0.20
(mm)

DT
FIY 9.73
-10.00  10.00
(%)

CC
FIY 9.73
-0.02  0.02
(mm)

SA
FNO 4.082
-0.20  0.20
(mm)

AS
FIY 10.77
-0.20  0.20
(mm)

DT
FIY 10.77
-10.00  10.00
(%)

CC
FIY 10.77
-0.02  0.02
(mm)

SA
FNO 4.077
-0.20  0.20
(mm)

AS
FIY 10.76
-0.20  0.20
(mm)

DT
FIY 10.76
-10.00  10.00
(%)

CC
FIY 10.76
-0.02  0.02
(mm)

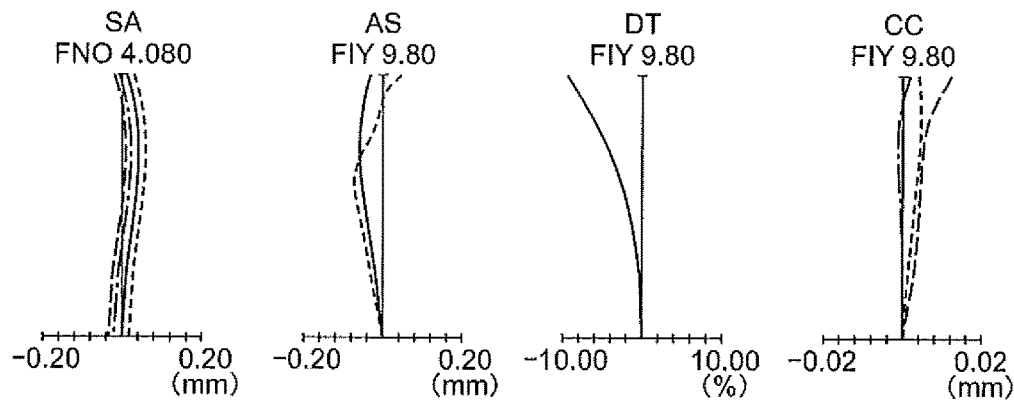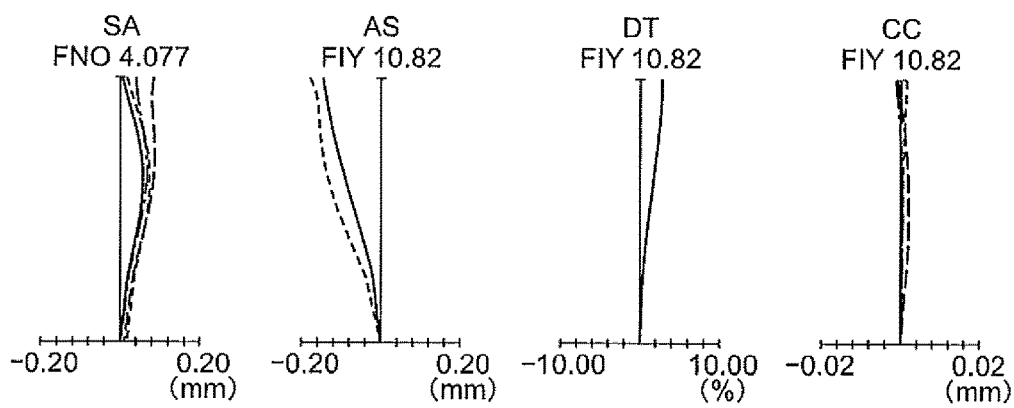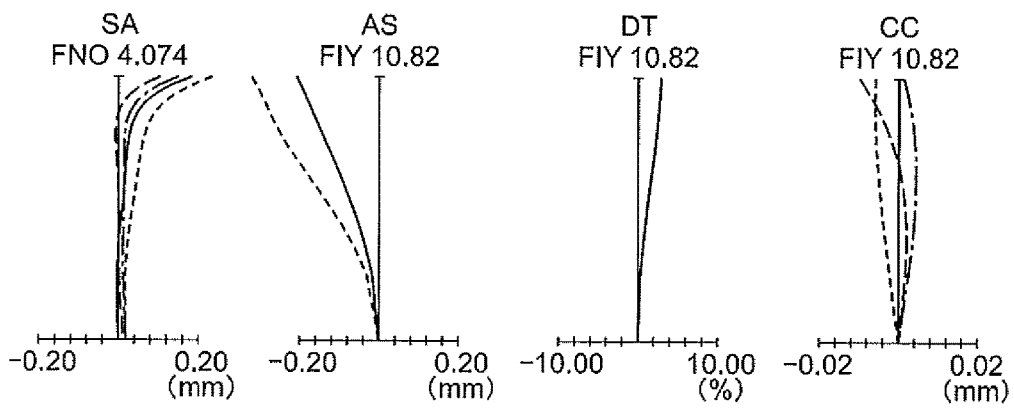

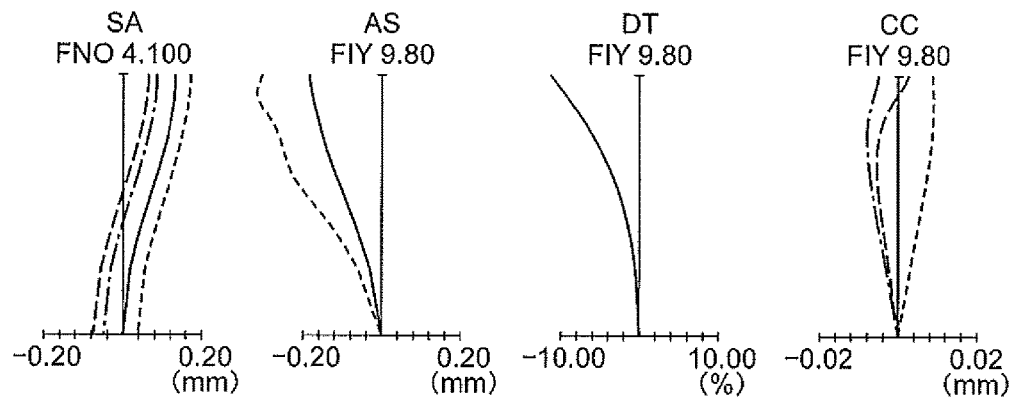
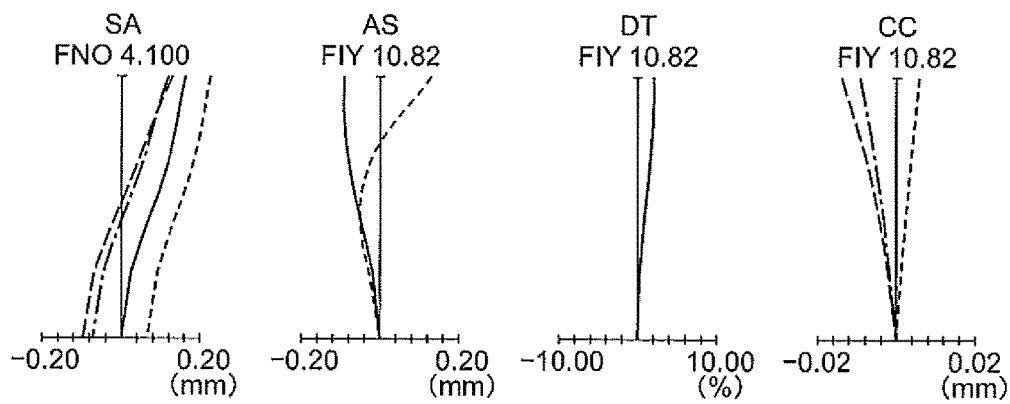
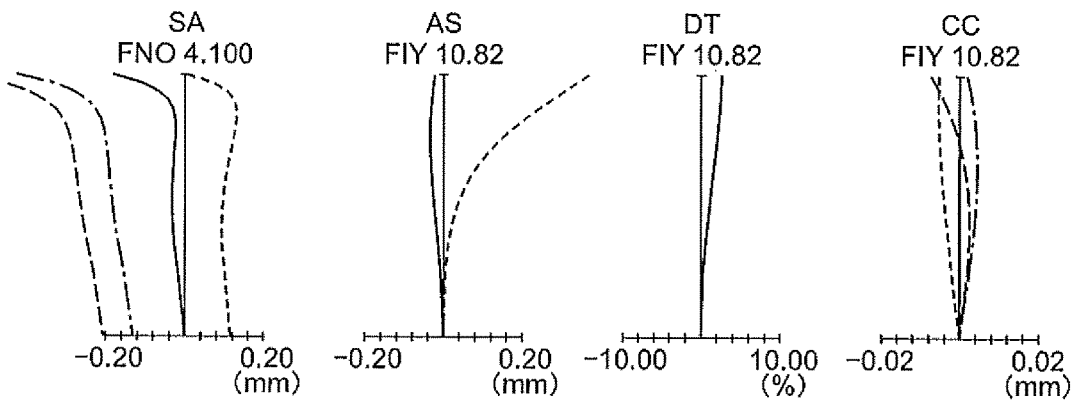

ZOOM LENS WITH BLUR CORRECTION AND IMAGE PICKUP APPARATUS USING THE SAME

CROSS-REFERENCE TO RELATED APPLICATION

The present application is based upon and claims the benefit of priority from the prior Japanese Patent Application No. 2015-109484 filed on May 29, 2015; the entire contents of which are incorporated herein by reference.

BACKGROUND OF THE INVENTION

Field of the Invention

The present invention relates to a zoom lens and an image pickup apparatus using the same.

Description of the Related Art

As a zoom lens having an image-blur correcting function, a zoom lens described in Japanese Patent Application Laid-open Publication No. 2012-141555 (first example) is available. In Japanese Patent Application Laid-open Publication No. 2012-141555, a lens unit (hereinafter, referred to as 'image-blur correcting unit') that moves in a direction perpendicular to an optical axis in an optical system is disposed. Moreover, by moving the image-blur correcting unit in a direction of negating the movement of an image due to camera shake, degradation of the image due to the camera shake is reduced.

SUMMARY OF THE INVENTION

A zoom lens according to an aspect of the present invention comprises in order from an object side,
a first lens unit having a positive refractive power,
a second lens unit having a negative refractive power,
a third lens unit having a positive refractive power, and
a predetermined lens unit which is disposed on an image side of the third lens unit, wherein
a distance between the first lens unit and the second lens unit changes to become wider at a telephoto end than the distance at a wide angle end, and
a distance between the second lens unit and the third lens unit changes to become narrower at the telephoto end than the distance at the wide angle end, and
an aperture stop is disposed on the image side of the second lens unit, and
the predetermined lens unit includes a first lens component which is fixed at the time of zooming, and
the first lens component moves perpendicularly with respect to an optical axis, for correcting a blur, and
a second lens component is disposed, leaving an air space on the image side of the first lens component, and
a sign of a refractive power of the second lens component differs from a sign of a refractive power of the first lens component, and
the following conditional expression (1) is satisfied;

$$3.4 \leq |f_1/f_3| \leq 9 \quad (1)$$

where,
$f_1$ denotes a focal length of the first lens unit, and
$f_3$ denotes a focal length of the third lens unit.

A zoom lens according to another aspect of the present invention comprises in order from an object side,
a first lens unit having a positive refractive power,
a second lens unit having a negative refractive power,
a third lens unit having a positive refractive power, and
a predetermined lens unit which is disposed on an image side of the third lens unit, wherein
a distance between the first lens unit and the second lens unit changes to become wider at a telephoto end than the distance at a wide angle end, and
a distance between the second lens unit and the third lens unit changes to become narrower at the telephoto end than the distance at the wide angle end, and
an aperture stop is disposed on the image side of the second lens unit, and
the predetermined lens unit includes a first lens component which is fixed at the time of zooming, and
the first lens component moves perpendicularly with respect to an optical axis, for correcting a blur, and
a second lens component is disposed, leaving an air space on the image side of the first lens component, and
a sign of a refractive power of the second lens component differs from a sign of a refractive power of the first lens component, and
the first lens component includes at least a positive lens and a negative lens, and
the third lens unit, at the time of zooming from the wide angle end to the telephoto end, moves monotonically toward the object side.

A zoom lens according to still another aspect of the present invention comprises in order from an object side,
a first lens unit having a positive refractive power,
a second lens unit having a negative refractive power,
a third lens unit having a positive refractive power, and
a predetermined lens unit which is disposed on an image side of the third lens unit, wherein
a distance between the first lens unit and the second lens unit changes to become wider at a telephoto end than the distance at a wide angle end, and
a distance between the second lens unit and the third lens unit changes to become narrower at the telephoto end than the distance at the wide angle end, and
an aperture stop is disposed on the image side of the second lens unit, and
the predetermined lens unit includes a first lens component which is fixed at the time of zooming, and
the first lens component moves perpendicularly with respect to an optical axis, for correcting a blur, and
a second lens component is disposed, leaving an air space on the image side of the first lens component, and
a sign of a refractive power of the second lens component differs from a sign of a refractive power of the first lens component, and
the first lens component includes at least a positive lens and a negative lens, and
the second lens component is disposed in the predetermined lens unit, and
the following conditional expressions (2) and (3) are satisfied;

$$5.3 \leq |f_1/f_{2t}| \leq 20 \quad (2)$$

$$0.3 \leq |f_{IS}/f_{GSb}| \leq 4.7 \quad (3)$$

where,
$f_1$ denotes a focal length of the first lens unit,
$f_{2t}$ denotes a focal length at the telephoto end of the second lens unit,
$f_{IS}$ denotes a focal length of the first lens component, and
$f_{GSb}$ denotes a focal length of the second lens component.

A zoom lens according to still another aspect of the present invention comprises in order from an object side,
a first lens unit having a positive refractive power,
a second lens unit having a negative refractive power, a third lens unit having a positive refractive power, and
a predetermined lens unit which is disposed on an image side of the third lens unit, wherein
a distance between the first lens unit and the second lens unit changes to become wider at a telephoto end than the distance at a wide angle end, and
a distance between the second lens unit and the third lens unit changes to become narrower at the telephoto end than the distance at the wide angle end, and
an aperture stop is disposed on the image side of the second lens unit, and
the predetermined lens unit includes a first lens component which is fixed at the time of zooming, and
the first lens component moves perpendicularly with respect to an optical axis, for correcting a blur, and
a second lens component is disposed, leaving an air space on the image side of the first lens component, and
a sign of a refractive power of the second lens component differs from a sign of a refractive power of the first lens component, and
the first lens component has a negative refractive power, and
the second lens component is disposed in the predetermined lens unit, and
the following conditional expressions (2) and (3) are satisfied;

$$5.3 \leq |f_1/f_{2t}| \leq 20 \quad (2)$$

$$0.3 \leq |f_{IS}/f_{GSb}| \leq 4.7 \quad (3)$$

where,
$f_1$ denotes the focal length of the first lens unit,
$f_{2t}$ denotes the focal length at the telephoto end of the second lens unit,
$f_{IS}$ denotes the focal length of the first lens component, and
$f_{GSb}$ denotes the focal length of the second lens component.

Moreover, an image pickup apparatus of the present invention comprises the zoom lens, and an image pickup element which has an image pickup surface.

BRIEF DESCRIPTION OF THE DRAWINGS

FIG. 5A, FIG. 5B, FIG. 5C, FIG. 5D, FIG. 5E, FIG. 5F, FIG. 5G, FIG. 5H, FIG. 5I, FIG. 5J, FIG. 5K, and FIG. 5L are aberration diagrams at the time of focusing to an object at infinity of the zoom lens according to the example 1;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L are aberration diagrams at the time of focusing to an object at infinity of the zoom lens according to the example 3;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of focusing to an object at infinity of the zoom lens according to the example 4;

DETAILED DESCRIPTION OF THE INVENTION

Figure 1A:
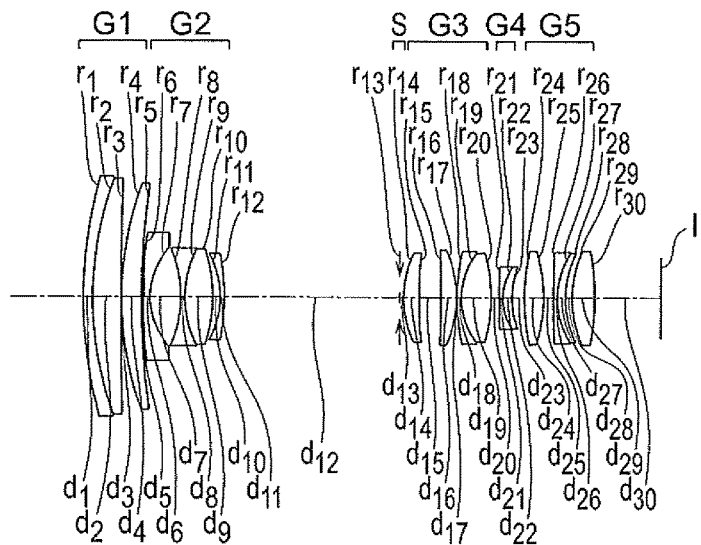
FIG. 1A, FIG. 1B, and FIG. 1C are lens cross-sectional views at the time of focusing to an object at infinity of a zoom lens according to an example 1.

Prior to explaining examples, action and effect of embodiments according to certain aspects of the present invention will be described below. An action and effect of the present embodiment will be described specifically by describing concrete examples. However, similar to a case of the examples to be described later, the aspects exemplified thereof are some of the aspects included in the present invention, and there is a large number of variations in these aspects. Therefore, the present invention is not restricted to the aspects that are exemplified.

A basic arrangement of a zoom lens according to the present embodiment will be described below. In the basic arrangement, the zoom lens includes in order from an object side, a first lens unit having a positive refractive power, a second lens unit having a negative refractive power, a third lens unit having a positive refractive power, and a predetermined lens unit which is disposed on an image side of the third lens unit, and a distance between the first lens unit and the second lens unit changes to become wider at a telephoto end than the distance at a wide angle end, and a distance between the second lens unit and the third lens unit changes to become narrower at the telephoto end than the distance at the wide angle end, and an aperture stop is disposed on the image side of the second lens unit, and the predetermined lens unit includes a first lens component which is fixed at the time of zooming, and the first lens component moves perpendicularly with respect to an optical axis, for correcting a blur, and a second lens component is disposed, leaving an air space on the image side of the first lens component, and a sign of a refractive power of the second lens component differs from a sign of a refractive power of the first lens component.

It is preferable that the zoom lens has a high zoom ratio and a wide angle of view at the wide angle end. The wide angle of view, for instance, is an angle of view for which, a half angle of view is 38 degrees, and even exceeding 40 degrees. Such wide angle of view is sometimes also called as a super wide angle. Moreover, high zoom ratio is a zoom ratio exceeding six times. However, a value of the angle of view and a value of the zoom ratio are not restricted to these values.

In the basic arrangement of the present embodiment, the first lens unit having a positive refractive power is disposed nearest to an object, and moreover, the second lens unit and the third lens units are disposed. Furthermore, the distance between the first lens unit and the second lens unit changes to become wider at the telephoto end than the distance at the wide angle end, and the distance between the second lens unit and the third lens unit changes to become narrower at the telephoto end than the distance at the wide angle end. Making such arrangement is effective for achieving the wide angle of view and high zoom ratio.

Moreover, by such arrangement, it is possible to secure a high zoom ratio and to shorten the overall length of an optical system at the telephoto end easily. Moreover, since it is possible to make a diameter of the aperture stop small, it is possible to make small both of a diameter of a lens in the third lens unit and a diameter of a lens positioned on the image side of the third lens unit.

The first lens component is disposed in the predetermined lens unit. The first lens component is fixed at the time of zooming, and when there is an image blur, the first lens component moves perpendicularly with respect to the optical axis. Accordingly, it is possible to reduce degradation of image due to the image blur. Here, the lens component is a single lens or a cemented lens, and has two surfaces in contact with air on the axis.

The first lens component being disposed in the lens unit which is fixed at the time of zooming, in the zoom lens of the present embodiment, an image-blur correcting unit is disposed in the lens unit which is fixed at the time of zooming.

As aforementioned, the lens unit that moves at the time of zooming is held by a moving member. Whereas, in the lens unit which is fixed at the time of zooming, no member which corresponds to the moving member is included. Therefore, as for the lens unit which moves at the time of zooming, there is no gap between the moving member and the fixed member. In other words, the gap which is one of the causes of an error at the time of calculating an amount of correction does not exist in the zoom lens of the present embodiment.

In such manner, in the zoom lens of the present embodiment, the image-blur correcting unit is disposed at a location where there is no gap which is one of the causes of an error. Therefore, it is possible to eliminate an occurrence of error at the time of calculating the amount of correction. As a result, a highly accurate control of image-blur becomes possible.

Moreover, by disposing the first lens component in a lens unit that is different from the first lens unit, the second lens unit, and the third lens unit, it is possible to use the lens units from the first lens unit up to the third lens unit as a specialized lens unit for the purpose of improving the zooming effect as well as small-sizing the optical system. Accordingly, in spite of being equipped with the image-blur correcting unit, small-sizing of the optical system becomes even easier.

Moreover, an arrangement is let to be such that, the zoom lens includes the second lens component having a refractive power of a sign different from a sign of a refractive power of the first lens component, on the image side of the first lens component. By making such arrangement, since it is possible to improve a sensitivity of image-plane shift (IS sensitivity), it is possible to reduce the amount of correction, and accordingly, it is possible to facilitate making a drive actuator small-sized and highly sensitive. The sensitivity of image-plane shift refers to an amount of movement of the image plane when the first lens component has been moved perpendicularly with respect to the optical axis by a unit amount.

In this case, for improving the sensitivity of image-plane shift as well as for making the movement of the first lens component easy, some air space is necessary between the first lens component and the second lens component. It is desirable that the air space is 0.3 mm or more. An air space is a distance from a center of the two lens components up to any position on a circumference.

Zoom lenses according to embodiments from a first embodiment to a fourth embodiment will be described below.

The zoom lens according to the first embodiment has the abovementioned basic arrangement, and the following conditional expression (1) is satisfied.

$$3.4 \leq |f_1/f_3| \leq 9 \tag{1}$$

where,
$f_1$ denotes a focal length of the first lens unit, and
$f_3$ denotes a focal length of the third lens unit.

In the basic arrangement, mainly, the first lens unit and the third lens unit bear a part in a zooming effect. Therefore, for improving the zoom ratio and shortening the overall length of the optical system, it is preferable to make a refractive power of the first lens unit large.

However, as the refractive power of the first lens unit is made large, since a position of an entrance pupil with respect to the first lens unit moves further toward the image side, and is separated apart from the first lens unit, a diameter of the first lens unit increases. Therefore, for shortening the overall length of the optical system and making a diameter of the optical system small, it is preferable to keep a balance of the refractive power of the first lens unit and the refractive power of the third lens unit, while making both the refractive power of the first lens unit and the refractive power of the third lens unit larger. For this, it is preferable that conditional expression (1) is satisfied.

By making so as not to fall below a lower limit value of conditional expression (1), either it becomes easy to make the diameter of the optical system small or to shorten the overall length of the optical system. Moreover, it is possible to prevent an increase in amount of a spherical aberration that occurs near the telephoto end, of the spherical aberration occurring in the first lens unit. Accordingly, a favorable imaging performance is achieved.

By making so as not to exceed an upper limit value of conditional expression (1), either the shortening of the overall length of the optical system becomes easy, or securing an appropriate back focus becomes easy. Moreover, it is possible to prevent an increase in the amount of spherical aberration that occurs in the third lens unit. Accordingly, a favorable imaging performance is achieved.

The zoom lens according to the second embodiment has the abovementioned basic arrangement, and the first lens component includes at least a positive lens and a negative lens, and the third lens unit, at the time of zooming from the wide angle end to the telephoto end, moves monotonically toward the object side.

As aforementioned, by moving the first lens component perpendicularly with respect to the optical axis, it is possible to reduce the degradation of an image due to image blur. It is preferable to make an amount of movement of the first lens component, or in other words, an amount of correction, as large as possible. By doing so, correction of image blur even in a case in which, an amount of image blur is large, becomes possible.

However, as the first lens component is moved perpendicularly with respect to the optical axis, a color separation in the first lens component occurs. As the amount of correction becomes larger, the color separation also increases. In this case, as the amount of correction is increased, degradation of the imaging performance at the time of correcting the image-blur increases. Therefore, in the first lens component, correction of a chromatic aberration becomes important. Consequently, by making the arrangement such that the first lens unit includes at least the positive lens and the negative lens, it is possible to make the amount of color separation even smaller.

Moreover, at the time of zooming from the wide angle end to the telephoto end, the third lens unit moves monotonically toward the object side. By adopting such arrangement, it is possible to improve the zooming effect of the third lens unit. As a result, it becomes easy to make zoom magnification high.

The zoom lens according to the third embodiment has the abovementioned arrangement, and the first lens component includes at least a positive lens and a negative lens, and the second lens component is disposed in the predetermined lens unit, and the following conditional expressions (2) and (3) are satisfied.

$$5.3 \leq |f_1/f_{2t}| \leq 20 \tag{2}$$

$$0.3 \leq |f_{IS}/f_{GSb}| \leq 4.7 \tag{3}$$

where, $f_1$ denotes a focal length of the first lens unit, $f_{2t}$ denotes a focal length at the telephoto end of the second lens unit, $f_{IS}$ denotes a focal length of the first lens component, and $f_{GSb}$ denotes a focal length of the second lens component.

In the zoom lens according to the third embodiment, the first lens component includes the positive lens and the negative lens similarly as in the zoom lens according to the second embodiment. Since an action and effect of the arrangement are already explained, the explanation thereof is omitted here.

The zoom lens includes the second lens component having a refractive power of a sign different from the sign of the refractive power of the first lens component, on the image side of the first lens component. By doing so, since it is possible to improve the sensitivity of the image-plane shift (IS sensitivity), it is possible to reduce the amount of correction, and accordingly, it is possible to facilitate making a drive actuator small-sized and highly sensitive.

At this time, it is preferable to dispose the second lens component in the predetermined lens unit. By doing so, the first lens component and the second lens component are disposed in the predetermined lens unit. Consequently, even in a case in which, the sensitivity of the image-plane shift has been improved, it is possible to hold the image-blur correcting unit stably. As a result, it is possible to carry out a highly accurate control of image blur easily.

For shortening the overall length of the optical system, the optical system may be arranged to include a telephoto arrangement, and also, an effect achieved by the telephoto arrangement may be enhanced. For shortening the overall length of the optical system at the telephoto end as well as for making the optical system small-sized, it is important to balance the focal length of the first lens component and the focal length of the second lens component. For such reason, it is preferable that conditional expression (2) is satisfied.

By making so as not to fall below a lower limit value of conditional expression (2), the refractive power of the second lens unit does not become excessively small. Therefore, shortening the overall length of the optical system becomes easy. Or, the refractive power of the first lens unit does not become excessively large. In this case, since it is possible to prevent the diameter of the first lens unit from becoming large, small-sizing of the optical system is facilitated. Moreover, since it is possible to prevent an increase in a positive distortion, it is possible to prevent an increase in a distortion mainly near the telephoto end.

By making so as not to exceed an upper limit value of conditional expression (2), the refractive power of the second lens unit does not become excessively large. In this case, since the refraction at a surface on a side of incidence of the second lens unit does not become large, it is possible to prevent the diameter of the first lens unit from becoming large. Or, shortening the overall length of the optical system becomes easy. Moreover, since it is possible to prevent a negative distortion from increasing, it is possible to prevent an increase in a distortion mainly near the wide angle end.

Either by making so as not to fall below the lower limit value of conditional expression (2) or by making so as not to exceed the upper limit value of conditional expression (2), it is possible to improve the sensitivity of the image-plane shift. In this case, since it is possible to prevent drive actuator from becoming large-sized, small-sizing of the optical system is facilitated. Moreover, since it is possible to prevent an increase in fluctuation of an astigmatism at the time of correcting the image-blur, a favorable imaging performance is achieved.

Either by making so as not to fall below a lower limit value of conditional expression (3) or by making so as not to exceed an upper limit value of conditional expression (3), it is possible to improve the sensitivity of the image-plane shift. As a result, since it is possible to prevent the drive actuator from becoming large, it is possible to make the optical system small-sized. Moreover, since it is possible to prevent an increase in fluctuation of the astigmatism at the time of correcting the image-blur, it is possible to achieve a favorable imaging performance.

The zoom lens according to the fourth embodiment has the abovementioned arrangement, and the first lens component has a negative refractive power, and the second lens component is disposed in the predetermined lens unit, and the following conditional expressions (2) and (3) are satisfied.

$$5.3 \leq |f_1/f_{2t}| \leq 20 \tag{2}$$

$$0.3 \leq |f_{IS}/f_{GSb}| \leq 4.7 \tag{3}$$

where, $f_1$ denotes the focal length of the first lens unit, $f_{2t}$ denotes the focal length at the telephoto end of the second lens unit, $f_{IS}$ denotes the focal length of the first lens component, and $f_{GSb}$ denotes the focal length of the second lens component.

By doing so, since the sensitivity of the image-plane shift is improved easily, it is possible to facilitate making the image-blur correcting unit small-sized and highly sensitive easily.

Since a technical significance of conditional expression (2) and (3) has already been explained, the description thereof is omitted here.

In the zoom lens according to the second embodiment and the zoom lens according to the third embodiment, it is preferable that the following conditional expression (1) is satisfied.

$$3.4 \leq |f_1/f_3| \leq 9 \tag{1}$$

where, $f_1$ denotes a focal length of the first lens unit, and $f_3$ denotes a focal length of the third lens unit.

Since a technical significance of conditional expression (1) has already been explained, the description thereof is omitted here.

In the zoom lens according to the first embodiment and the zoom lens according to the third embodiment, it is preferable that the third lens unit, at the time of zooming from the wide angle end to the telephoto end, moves monotonically toward the object side.

By making such arrangement, it is possible to improve the zooming effect of the third lens unit. As a result, it becomes easy to make the zoom magnification high.

In the zoom lens according to the first embodiment and the zoom lens according to the second embodiment, it is preferable that the following conditional expression (2) is satisfied.

$$5.3 \leq |f_1/f_{2t}| \leq 20 \quad (2)$$

where, $f_1$ denotes a focal length of the first lens unit, and $f_{2t}$ denotes a focal length at the telephoto end of the second lens unit.

Since a technical significance of conditional expression (2) has already been explained, the description thereof is omitted here.

In the zoom lens according to the first embodiment and the zoom lens according to the second embodiment, it is preferable that the following conditional expression (3) is satisfied.

$$0.3 \leq |f_{IS}/f_{GSb}| \leq 4.7 \quad (3)$$

where, $f_{IS}$ denotes a focal length of the first lens component, and $f_{GSb}$ denotes a focal length of the second lens component.

Since a technical significance of conditional expression (3) has already been explained, the description thereof is omitted here.

In the zoom lens according to the first embodiment, the zoom lens according to the second embodiment, the zoom lens according to the third embodiment, and the zoom lens according to the fourth embodiment (hereinafter, referred to as 'the zoom lens according to the present embodiment'), it is preferable that the predetermined lens unit is fixed at the time of zooming.

By doing so, all lenses included in the predetermined lens unit are fixed at the time of zooming. Therefore, it is possible to eliminate an occurrence of error at the time of correcting a blur. As a result, a highly accurate control of image-blur becomes possible.

In the zoom lens according to the present embodiment, it is preferable that the first lens unit is positioned further on the object side at the telephoto end than at the wide angle end.

As the first lens unit is moved in such manner, the first lens unit, at the telephoto end, is in a state of being drawn out more than at the wide angle end. Therefore, it is possible to improve the zooming effect by the first lens unit and the second lens unit. As a result, it becomes easy to make the zoom magnification high.

Moreover, by positioning the first lens unit further on the object side at the telephoto end than at the wide angle end, a large space is created on the image side of the first lens unit. Therefore, it becomes easy to secure a space for moving the lens units between the wide angle end and the telephoto end. As a result, it becomes possible to shorten the overall length of the optical system near the wide angle end.

Moreover, in the zoom lens according to the present embodiment, it is preferable that a lens unit having a negative refractive power is disposed between the third lens unit and the predetermined lens unit, and a positive lens component is disposed on the image side of the lens unit having a negative refractive power.

In the zoom lens according to the present embodiment, a diameter of the first lens unit is the largest among the diameters of all the lens units. Therefore, by doing as aforementioned, it is possible to form a magnifying optical system by the lens unit having a negative refractive power and the positive lens component. Therefore, it is possible to make small a diameter of a lens in the first lens unit.

In such manner, in the zoom lens according to the present embodiment, in the zoom lens having a wide angle of view at the wide angle end, and a high zoom ratio, small-sizing of the optical system is possible, and moreover, it is possible to secure a favorable imaging performance.

Moreover, in the zoom lens according to the present embodiment, it is preferable that a lens unit having a negative refractive power is disposed between the third lens unit and the predetermined lens unit, and the lens unit having a negative refractive power includes a focusing lens unit.

A diameter of a light beam incident on the lens unit having a negative refractive power is small due to the positive refractive power of the third lens unit. Therefore, it is possible to make the lens unit having a negative refractive power small-sized and light-weight. Consequently, when the lens unit having a negative refractive power includes the focusing lens unit, since it is possible to move the lens unit at a high speed, it is possible to carry out focusing at a high speed.

Moreover, by disposing the lens unit having a negative refractive power on the image side of the third lens unit having a positive refractive power, it is possible to improve a focusing sensitivity of the focusing lens unit in the lens unit having a negative refractive power, as well as to make small a diameter of the lens unit having a negative refractive power. As a result, it is possible to realize a focusing unit which is small-sized and light-weight.

Moreover, in the zoom lens according to the present embodiment, it is preferable that a fourth lens unit having a negative refractive power is disposed between the third lens unit and the predetermined lens unit, and the fourth lens unit includes a negative lens and a positive lens, and the predetermined lens unit is a fifth lens unit having a positive refractive power, and the following conditional expression (4) is satisfied.

$$6.0 \leq vd_{4G\_max\_n} - vd_{4G\_min\_p} \leq 45 \quad (4)$$

where, $vd_{4G\_max\_n}$ denotes the maximum Abbe's number from among Abbe's numbers for negative lenses in the fourth lens unit, and $vd_{4G\_min\_p}$ denotes the minimum Abbe's number from among Abbe's numbers for positive lenses in the fourth lens unit.

In the fourth lens unit having a negative refractive power, by a combination with the fifth lens unit having a positive refractive power, it is possible to enhance an effect of correcting mainly a curvature of field. Accordingly, it is possible to secure a favorable imaging performance throughout an entire zoom range.

On the other hand, by an image magnification of the fourth lens unit becoming large, sometimes, mainly an amount of a longitudinal chromatic aberration and a spherical aberration that occur becomes large. For achieving a favorable imaging performance throughout the entire zoom range, it is preferable to correct these aberrations. For this, it is preferable that the conditional expression (4) is satisfied.

By making so as not to fall below a lower limit value of conditional expression (4), it is possible to correct the longitudinal chromatic aberration. As a result, it is possible to achieve a favorable imaging performance. By making so as not to exceed an upper limit value of conditional expression (4), it becomes easy to achieve both of a correction of a chromatic aberration and a correction of the spherical aberration. As a result, a favorable imaging performance is achieved throughout the entire zoom range.

Moreover, in the zoom lens according to the present embodiment, it is preferable that the second lens unit includes in order from the object side to the image side, a negative lens having an image-side surface which is a concave surface directed toward the image side, a negative lens, and a positive lens having an image-side surface which is a convex surface directed toward the image side.

For making an F-number small, as well as facilitating the making the zoom magnification high and shortening of the overall length of the optical system, it is preferable to make the refractive power of the second lens unit large. However, an increase in the refractive power of the second lens unit becomes a cause of fluctuation of aberration in the second lens unit at the time of zooming. Concretely, mainly the curvature of field and the spherical aberration fluctuate between the wide angle end and the telephoto end.

Therefore, by arranging the second lens unit as mentioned above, it is possible to prevent a sharp change in an angle of refraction of a light ray at a lens surface at the time of zooming. As a result, it is possible to maintain a state in which, both the curvature of field and the spherical aberration are corrected favorably throughout the entire zoom range.

In such manner, according to the zoom lens of the present embodiment, it is possible to make the F-number small throughout the entire zoom range as well as to make the zoom magnification high, while maintaining the favorable imaging performance. The small F-number refers to an F-number not higher than 5.0 for example.

Moreover, in the zoom lens according to the present embodiment, it is preferable that the second lens unit includes a first sub-unit having a negative refractive power and a second sub-unit having a negative refractive power, and the second sub-unit includes a focusing lens unit.

Since the second sub-unit is positioned near the aperture stop, a lens diameter is small. Therefore, by the second sub-unit including the focusing lens unit, it is possible to make a diameter of the focusing lens unit small. In this case, since it is possible to make a focusing lens unit light-weight, a high-speed AF (auto focus) becomes possible. Accordingly, in the zoom lens having a wide angle of view at the wide angle end and a high zoom ratio, a favorable imaging performance is secured while being small-sized, and furthermore, it is possible to make the AF high-speed.

In the aperture stop, for preventing a light leakage, it is preferable to secure a large area of a light shielding portion other than an opening. Accordingly, a space of a certain width is created around the aperture stop. Here, the second sub-unit is positioned near the aperture stop. Therefore, when the second sub-unit includes the focusing lens unit, an actuator for focusing is provided near the aperture stop.

As a result, since two actuators are disposed near the aperture stop, it is possible to secure efficiently a space for disposing the actuators. Moreover, it is possible to minimize the space for disposing the actuators.

Moreover, in the zoom lens according to the present embodiment, it is preferable that the second lens unit includes a first sub-unit and a second sub-unit, and the first sub-unit includes in order from the object side to the image side, a negative lens having an image-side surface which is a concave surface directed toward the image side, a negative lens, and a positive lens having an image-side surface which is a convex surface directed toward the image side.

For making the F-number small, as well as facilitating the making the zoom magnification high and shortening of the overall length of the optical system, it is preferable to make the refractive power of the second lens unit large. However, an increase in the refractive power of the second lens unit may become a cause of fluctuation of aberration in the second lens unit at the time of zooming. Concretely, mainly the curvature of field and the spherical aberration may fluctuate between the wide angle end and the telephoto end.

In the first sub-unit, a height of a marginal ray becomes higher at the wide angle end as compared to the height at the telephoto end. Therefore, by arranging the first sub-unit as mentioned above, it is possible prevent a sharp change in an angle of refraction of a light ray at the first sub-unit at the time of zooming. As a result, it is possible to maintain a state in which, both the curvature of field and the spherical aberration are corrected favorably throughout the entire zoom range.

In such manner, according to the zoom lens of the present embodiment, it is possible to make the F-number small throughout the entire zoom range as well as to make the zoom magnification high, while maintaining the favorable imaging performance.

Moreover, as both the curvature of field and the spherical aberration are corrected favorably in the first sub-unit, in a case in which, the second sub-unit includes one negative lens, or even in a case in which, the second sub-unit includes one negative lens and one positive lens, it is possible to make small an aberration that occurs in the second sub-unit. Accordingly, even when the second sub-unit is provided with a focusing lens unit, it is possible to realize a high-speed focusing with a lesser aberration fluctuation.

Moreover, in the zoom lens according to the present embodiment, it is preferable that in the second lens unit, a negative lens having a concave surface directed toward the image side is disposed nearest to an object, and in the negative lens which is nearest to the object, an absolute value of a radius of curvature of an image-side surface is smaller as compared to a radius of curvature of an object-side surface, and the following conditional expression (5) is satisfied.

$$1.78 \leq nd_{2G\_n1} \leq 2.3 \quad (5)$$

where, $nd_{2G\_n1}$ denotes a refractive index of the negative lens nearest to the object in the second lens unit.

For making the F-number small, as well as facilitating the making the zoom magnification high and shortening of the overall length of the optical system, it is preferable to make the refractive power of the second lens unit large. However, at a position nearest to the object in the second lens unit, sometimes, a change in the height of a light ray at the time of zooming becomes large. When the change in the height of a light ray is large, a change in an angle of refraction of a light ray at a lens nearest to the object also becomes sharp. Therefore, when the refractive power of the second lens unit is made large, accordingly, mainly a fluctuation in the curvature of field at the time of zooming becomes large.

Therefore, it is preferable to dispose the negative lens having a concave surface directed toward the image side, nearest to the object, in the second lens unit. Moreover, it is preferable to make the absolute value of the radius of curvature of the image-side surface of the negative lens smaller as compared to the absolute value of the radius of curvature of the object-side surface. By doing so, it is possible to lessen the sharp change in the angle of refraction of a light ray at the lens surface at the time of zooming. As a result, it is possible to lessen the fluctuation in the curvature of field at the time of zooming.

Moreover, by satisfying conditional expression (5), it is possible to lessen further the curvature of field at the time of zooming. As a result, it is possible to make the F-number small throughout the entire zoom range, as well as to make the zoom magnification high, while maintaining the favorable imaging performance.

By making so as not to fall below a lower limit value of conditional expression (5), it is possible to achieve an effect of correcting the curvature of field. By making so as not to exceed an upper limit value of conditional expression (5), it is possible to make small a tendency of an image plane from being inclined wholly toward a minus side. As a result, it is possible to achieve a favorable imaging performance.

Moreover, in the zoom lens according to the present embodiment, it is preferable that the second lens unit includes a first sub-unit and a second sub-unit, and at the time of zooming, a distance between the first sub-unit and the second sub-unit changes.

For making the zoom ratio high, it is preferable to make the refractive power of the second lens unit large. However, when the refractive power of the second lens unit is made large, a tendency of an increase in the change of the curvature of field at the time of zooming becomes strong. Therefore, the second lens unit is formed by the first sub-unit and the second sub-unit, and a distance between the first sub-unit and the second sub-unit is let to be variable. By making such arrangement, it becomes easy to make the zoom magnification high, while suppressing an increase in the fluctuation of the curvature of field.

Moreover, in the zoom lens of the present embodiment, it is preferable that the first lens unit includes at least one negative lens and two positive lenses.

When the F-number is made small, as well as making the zoom magnification high and shortening the overall length of the optical system are facilitated, the diameter of the first lens unit becomes large, and moreover, the refractive power of the first lens unit becomes large. As the diameter of the first lens unit becomes large and the refractive power of the first lens unit becomes large, in the first lens unit, mainly the spherical aberration occurs near the telephoto end. Therefore, it is preferable to maintain a state in which, the spherical aberration has been corrected favorably even when the diameter of the first lens unit becomes large and the refractive power of the first lens unit becomes large.

For this, in the first lens unit, it is preferable to make at least two positive lenses share the positive refractive power. It is preferable that the number of positive lenses that are made to share the positive refractive power is two.

Furthermore, it is preferable to dispose a negative lens in the first lens unit. By doing so, it is possible to correct the chromatic aberration favorably.

Moreover, it is preferable to make Abbe's number for the negative lens smaller than Abbe's number for the positive lens. By disposing such negative lens in the first lens unit, since mainly, both the chromatic aberration of magnification near the wide angle end and the longitudinal chromatic aberration near the telephoto end are corrected favorably, it is possible to reduce an occurrence of the chromatic aberration in the first lens unit. As a result, a favorable imaging performance is achieved throughout the entire zoom range.

Moreover, in the zoom lens according to the present embodiment, it is preferable that the first lens unit includes at least a negative lens and a positive lens, and the following conditional expression (6) is satisfied.

$$70.5 \leq vd_{1G\_max\_p} \quad (6)$$

where, $vd_{1G\_max\_p}$ denotes the maximum Abbe's number from among Abbe's numbers for positive lenses in the first lens unit.

As aforementioned, it is preferable that the zoom lens has a wide angle of view at the telephoto end, and a high zoom ratio. Particularly, in the zoom lens with a high zoom ratio, sometimes, both of an amount of the chromatic aberration of magnification that occurs at the wide angle end and an amount of the longitudinal chromatic aberration that occurs at the telephoto end increase. The chromatic aberration that occurs near the telephoto end of the first lens unit is enlarged substantially in a lens unit positioned on the image side of the first lens unit. Therefore, by satisfying conditional expression (6), it is possible to suppress the occurrence of the chromatic aberration.

By making so as not to fall below a lower limit value of conditional expression (6), it is possible to prevent the correction of the longitudinal chromatic aberration in the first lens unit from being insufficient. Therefore, it is possible to suppress an increase in the longitudinal chromatic aberration that occurs near the telephoto end. As a result, it is possible to achieve a favorable imaging performance.

Here, the first lens unit may be let to include by one negative lens and two positive lenses. By doing so, it is possible to make the zoom magnification high with lesser number of lenses.

Moreover, in the zoom lens according to the present embodiment, it is preferable that the third lens unit includes at least a negative lens and a positive lens, and the following conditional expression (7) is satisfied.

$$70.5 \leq vd_{3G\_max\_p} \quad (7)$$

where, $vd_{3G\_max\_p}$ denotes the maximum Abbe's number from among Abbe's numbers for positive lenses in the third lens unit.

For shortening the overall length of the optical system, it is preferable to make the refractive power of the third lens unit large. However, when the refractive power of the third lens unit is made large, sometimes, mainly the longitudinal chromatic aberration occurs near the telephoto end. For correcting the chromatic aberration in the third lens unit having a positive refractive power, it is preferable to bring Abbe's number for the positive lens used in the third lens unit on a low-dispersion side, as well as, to bring Abbe's number for the negative lens used in the third lens unit on a high-dispersion side. For this, it is preferable that the conditional expression (7) is satisfied.

By making so as not to fall below a lower limit value of conditional expression (7), it is possible to correct the longitudinal chromatic aberration near the telephoto end. As a result, it is possible to achieve a favorable imaging performance. Or, since the refractive power of the third lens unit does not become excessively small, shortening the overall length of the optical system becomes easy.

Moreover, in the zoom lens according to the present embodiment, it is preferable that the first lens component has a negative refractive power.

In this case, an arrangement is such that the third lens unit having a positive refractive power is disposed on the object side of the first lens component having a negative refractive power, and moreover, the second lens component having a positive refractive power having a sign opposite to a sign of the refractive power of the first lens component is disposed on the image side. Accordingly, since the sensitivity of the image-plane shift is improved easily, it is possible to facilitate making the image-blur correcting unit small-sized and highly sensitive easily.

Moreover, in the zoom lens according to the present embodiment, it is preferable that the predetermined lens unit is disposed nearest to an image.

By disposing the predetermined lens unit nearest to the image, an arrangement becomes such that, the lens unit having the zooming effect is not on the image side of the first lens unit. As a result, it is possible to make the sensitivity of the image-plane shift constant, from the wide angle end up to the telephoto end. Accordingly, an electrical control at the time of correcting the image-blur becomes easier. Moreover, since an arrangement becomes such that it is not necessary to dispose a unit that drives a lens on the image side, it becomes easy to secure a space for a drive mechanism for correcting the image-blur. As a result, small-sizing of the optical system becomes easy.

Moreover, in the zoom lens according to the present embodiment, it is preferable that the first lens component includes at least a positive lens and a negative lens.

By doing so, it is possible to make an amount of color separation in the first lens component even smaller. As a result, it is possible to prevent degradation of imaging performance at the time of correcting the image blur.

Moreover, in the zoom lens according to the present embodiment, it is preferable that the following conditional expression (8) is satisfied.

$$0.03 \le d_{IS}/IH_t \quad (8)$$

where, $d_{IS}$ denotes a distance on an optical axis between a surface nearest to an image of the first lens component and a surface nearest to an object of the second lens component, and $IH_t$ denotes an image height at the telephoto end.

As aforementioned, for improving the sensitivity of image-plane shift and for making the movement of the first lens component easy, some air space is necessary between the first lens component and the second lens component. For this, it is preferable that the conditional expression (8) is satisfied.

By making so as to exceed a lower limit value of conditional expression (8), drive of the image-blur correcting unit becomes easy.

Moreover, in the zoom lens according to the embodiment, it is preferable that the aperture stop is disposed on the object side of the predetermined lens unit.

Accordingly, it is possible to make small both a lens diameter of the third lens unit and a lens diameter of the predetermined lens unit. Furthermore, it is preferable to dispose the aperture stop between the second lens unit and the third lens unit. Accordingly, making a diameter of the first lens unit and a diameter of the second lens unit small becomes easy.

Moreover, in the zoom lens according to the embodiment, it is preferable that the third lens unit includes at least two lens components having a positive refractive power.

By making the refractive power of the third lens unit large, it is possible to improve the zooming effect of the third lens unit. However, when the refractive power of the third lens unit is made large, sometimes the spherical aberration occurs in the third lens unit because of the large refractive power. Therefore, by letting the positive refractive power be shared by a plurality of lens components having a positive refractive power in the third lens unit, it is possible to reduce the amount of the spherical aberration that occurs.

Moreover, in the zoom lens according to the present embodiment, it is preferable that the following conditional expression (9) is satisfied.

$$-2.5 \le f_t/\exp_t \le 0.3 \quad (9)$$

where, $f_t$ denotes a focal length of the overall zoom lens system at the telephoto end, and $\exp_t$ denotes a distance from a paraxial image forming surface up to an exit pupil of the zoom lens at the telephoto end.

By making so as not to fall below a lower limit value of conditional expression (9), it is possible to suppress an increase in a positive distortion near the telephoto end. By making so as not to exceed an upper limit value of conditional expression (9), it is possible to suppress an increase in a lens diameter in the rearmost lens unit. As a result, small-sizing of the optical system becomes easy.

Moreover, in the zoom lens according to the present embodiment, it is preferable that the second lens unit includes a positive lens, and the following conditional expression (10) is satisfied.

$$-0.015 \le Tp_{2G\_min\_p} \le 0.015 \quad (10)$$

where, $$Tp_{2G\_min\_p} = \theta g F_{2G\_p} - (-0.0016 \times vd_{2G\_p} + 0.6415)$$

$$\theta g F_{2G\_p} = (ng_{2G\_p} - nF_{2G\_p})/(nF_{2G\_p} - nC_{2G\_p})$$

$vd_{2G\_p}$ denotes Abbe's number for a predetermined positive lens in the second lens unit, each of $ng_{2G\_p}$, $nF_{2G\_p}$, and $nC_{2G\_p}$ denotes a refractive index of the predetermined positive lens in the second lens unit, for a g-line, an F-line, and a C-line respectively, and the predetermined positive lens in the second lens unit is a positive lens for which Abbe's number is the smallest, from among the positive lenses in the second lens unit.

In the second lens unit, mainly, the chromatic aberration of magnification occurs near the wide angle end, and the longitudinal chromatic aberration occurs near the telephoto end. For correcting the chromatic aberration of the second lens unit having a negative refractive power, it is preferable to bring Abbe's number for the positive lens used in the second lens unit to a high-dispersion side as much as possible. Bringing Abbe's number to the high-dispersion side means, making Abbe's number small or making the dispersion large.

However, when the refractive power of the second lens unit is made large in a state of Abbe's number for the positive lens brought to the high-dispersion side, sometimes a secondary spectrum occurs substantially due to the refractive power of the second lens unit is made large. Therefore, for maintaining a state in which, the chromatic aberration is suppressed favorably throughout the entire zoom range, using a glass which has a characteristic of being capable of reducing the occurrence of the secondary spectrum, for the positive lens in the second lens unit, is effective.

For such reason, an arrangement is made such that the predetermined lens satisfies conditional expression (10). By the predetermined lens satisfying conditional expression (10), it is possible to suppress an increase in the secondary spectrum even when the refractive power of the second lens unit is made large.

By making so as not to fall below a lower limit value of conditional expression (10), it is possible to correct the secondary spectrum that occurs in the second lens unit. In this case, since it is possible to suppress an increase in the longitudinal chromatic aberration and the chromatic aberration of magnification that occur, a favorable imaging performance is achieved. By making so as not to exceed an upper limit value of conditional expression (10), since it is possible to weaken the tendency of the correction of the secondary spectrum in the second lens unit from becoming excessive, it is possible to correct the longitudinal chromatic aberration and the chromatic aberration of magnification in a balanced manner.

Moreover, in the zoom lens according to the present embodiment, it is preferable that the second lens unit includes a negative lens, and the following conditional expression (11) is satisfied.

$$-0.012 \leq Tp_{2G\_max\_n} \leq 0.06 \quad (11)$$

where, $$Tp_{2G\_max\_n} = \theta gF_{2G\_n} - (-0.0016 \times vd_{2G\_n} + 0.6415)$$

$$\theta gF_{2G\_n} = (ng_{2G\_n} - nF_{2G\_n})/(nF_{2G\_n} - nC_{2G\_n})$$

$vd_{2G\_n}$ denotes Abbe's number for a predetermined negative lens in the second lens unit, each of $ng_{2G\_n}$, $nF_{2G\_n}$, and $nC_{2G\_n}$ denotes a refractive index of the predetermined negative lens in the second lens unit, for a g-line, an F-line, and a C-line respectively, and the predetermined negative lens in the second lens unit is a negative lens for which Abbe's number is the largest, from among the positive lenses in the second lens unit.

In the second lens unit, sometimes, mainly the chromatic aberration of magnification occurs near the wide angle end, and the longitudinal chromatic aberration occurs near the telephoto end. For suppressing the occurrence of the chromatic aberration in the second lens unit having a negative refractive power, it is preferable to bring Abbe's number for the positive lens used in the second lens unit to a high-dispersion side as much as possible.

However, when the refractive power of the second lens unit is made large in a state of Abbe's number for the positive lens brought to the high-dispersion side, tendency of the second spectrum occurring substantially is enhanced. Therefore, for maintaining a state in which, the chromatic aberration is suppressed favorably throughout the entire zoom range, using a glass which has a characteristic of being capable of correcting the secondary spectrum, for the negative lens in the second lens unit, is effective. For such reason, it is preferable that the conditional expression (11) is satisfied.

By making so as not to fall below a lower limit value of conditional expression (11), it is possible to correct the secondary spectrum that occurs in the second lens unit. In this case, since it is possible to suppress an increase in the longitudinal chromatic aberration and the chromatic aberration of magnification that occur, a favorable imaging performance is achieved. By making so as not to exceed an upper limit value of conditional expression (11), since it is possible to weaken the tendency of the correction of the secondary spectrum in the second lens unit from becoming excessive, it is possible to correct the longitudinal chromatic aberration and the chromatic aberration of magnification in a balanced manner.

Moreover, in the zoom lens according to the present embodiment, it is preferable that the second lens unit includes at least a negative lens and a positive lens, and the following conditional expression (12) is satisfied.

$$55 \leq vd_{2G\_max\_n} \quad (12)$$

where, $vd_{2G\_max\_n}$ denotes the maximum Abbe's number from among Abbe's numbers for negative lenses in the second lens unit.

As aforementioned, for shortening the overall length of the optical system, it is preferable to make the refractive power of the second lens unit large. However, when the refractive power of the second lens unit is made large, sometimes, mainly the chromatic aberration of magnification occurs near the wide angle end and the longitudinal chromatic aberration occurs near the telephoto end. For correcting the chromatic aberration of the second lens unit having a negative refractive power, it is preferable to bring Abbe's number for the positive lens used in the second lens unit to a high-dispersion side, as well as to bring Abbe's number for the negative lens used in the second lens unit to a low-dispersion side. For this, it is preferable that the conditional expression (12) is satisfied.

By making so as not to fall below a lower limit value of conditional expression (12), it is possible to correct sufficiently both the chromatic aberration of magnification near the wide angle end and the longitudinal chromatic aberration near the telephoto end. As a result, it is possible to achieve a favorable imaging performance.

Moreover, in the zoom lens according to the present embodiment, it is preferable that the second lens unit includes at least a negative lens and a positive lens, and the following conditional expression (13) is satisfied.

$$15 \leq vd_{G2\_min\_p} \leq 32 \quad (13)$$

where, $vd_{G2\_min\_p}$ denotes the minimum Abbe's number from among Abbe's numbers for positive lenses in the second lens unit.

By making the negative refractive power of the second lens unit large, it is possible to improve the zoom ratio. Moreover, accordingly, since it is possible to shorten the overall length of the optical system and to make a diameter of the second lens unit small, it is possible to make the optical system small-sized.

However, in the second lens unit, sometimes, mainly the chromatic aberration of magnification occurs near the wide angle end, and the longitudinal chromatic aberration occurs near the telephoto end. In the second lens unit, a height of a marginal ray becomes higher at the wide angle end as compared to the height at the telephoto end. For such reason, for correcting these aberrations favorably at the wide angle end and at the telephoto end, it is preferable to bring Abbe's number for the positive lens in the second lens unit on a high-dispersion side as much as possible. For this, it is preferable that the conditional expression (13) is satisfied.

By making so as not to fall below a lower limit value of conditional expression (13), it is possible to suppress the correction of chromatic aberration from becoming excessive. By making so as not to exceed an upper limit value of conditional expression (13), it is possible to prevent the correction of chromatic aberration from becoming insufficient. As a result, it is possible to achieve a favorable imaging performance.

Moreover, in the zoom lens according to the present embodiment, it is preferable that the third lens unit includes at least a negative lens and a positive lens, and the following conditional expression (14) is satisfied.

$$70.5 \leq vd_{3G\_max\_p} \quad (14)$$

where, $vd_{3G\_max\_p}$ denotes the maximum Abbe's number from among Abbe's numbers for positive lenses in the third lens unit.

For shortening the overall length of the optical system, it is preferable to make the refractive power in the third lens unit large. However, when the refractive power of the third lens unit is made large, sometimes, mainly the longitudinal chromatic aberration occurs near the telephoto end. For correcting the chromatic aberration of the third lens unit having a positive refractive power, it is preferable to bring Abbe's number for the positive lens used in the third lens unit on a low-dispersion side, as well as, to bring Abbe's number for the negative lens used in the third lens unit on a high-dispersion side. For this, it is preferable that the conditional expression (14) is satisfied.

By making so as not to fall below a lower limit value of conditional expression (14), it is possible to correct the longitudinal chromatic aberration near the telephoto end. As a result, it is possible to achieve a favorable imaging performance. Or, since the refractive power of the third lens unit does not become excessively small, shortening the overall length of the optical system becomes easy.

Moreover, in the zoom lens according to the present embodiment, it is preferable that the following conditional expression (15) is satisfied.

$$1.05 \leq |\Phi_{maxt}/f_{2t}| \leq 3.0 \quad (15)$$

where, $\Phi_{maxt}$ denotes the maximum diameter of an entrance pupil at the telephoto end, and is expressed by $\Phi_{maxt} = f_t/Fno_t$, $f_t$ denotes a focal length of the overall zoom lens system at the telephoto end, $Fno_t$ denotes the smallest F-number at the telephoto end, and $f_{2t}$ denotes a focal length at the telephoto end of the second lens unit.

As aforementioned, for small-sizing of the optical system, it is necessary to make the refractive power of the second lens unit large. However, when the refractive power of the second lens unit is made large, mainly an amount of the spherical aberration, the curvature of field, the chromatic aberration of magnification, and the longitudinal chromatic aberration that occur becomes large. Therefore, for suppressing the occurrence of these aberrations and making the F-number small, it is preferable that the conditional expression (15) is satisfied. By satisfying conditional expression (15), it is possible to realize an optical system having a small F-number.

By making so as not to fall below a lower limit value of conditional expression (15), shortening the overall length of the optical system becomes easy. By making so as not to exceed an upper limit value of conditional expression (15), it is possible to suppress an increase in aberrations in the second lens unit, mainly, an increase in an amount of the spherical aberration, the curvature of field, the chromatic aberration of magnification, and the longitudinal chromatic aberration that occur in the second lens unit. In this case, in the second lens unit, since it is not necessary to add a lens for aberration correction, small-sizing of the optical system is facilitated.

Moreover, in the zoom lens according to the present embodiment, it is preferable that the first lens component has a negative refractive power, and a lens component having a positive refractive power, which is fixed at the time of zooming, is disposed at a position on the object side, nearest to the first lens component.

The second lens component having a positive refractive power is disposed on the image side of the first lens component. Therefore, by disposing the lens component having a positive refractive power at a position on the object side, nearest to the first lens component, not only that the refractive power on the image side of the first lens component becomes a positive refractive power, but also the refractive power on the object side of the first lens component becomes a positive refractive power. By doing so, since an effect of converging a light beam immediately before the first lens component is enhanced, it is possible to make the first lens component small-sized, as well as to improve the sensitivity of the image-plane shift. As a result of this, it becomes easy to make small a diameter of the image-blur correcting unit, and also, it is possible to improve the sensitivity of the image-plane shift.

Moreover, since the image-blur correcting unit is disposed in the lens unit which is fixed at the time of zooming, it is possible to reduce an error in sensitivity of the image-plane shift. As a result, image-blur correction with even higher accuracy becomes possible.

Moreover, in the zoom lens according to the present embodiment, it is preferable that the first lens component has a negative refractive power, and a lens unit having a positive refractive power is disposed at a position on the object side, nearest to the first lens component.

The second lens component having a positive refractive power is disposed on the image side of the first lens component. Therefore, by disposing the lens unit having a positive refractive power at a position on the object side, nearest to the first lens component, not only that the refractive power on the image side of the first lens component becomes a positive refractive power, but also the refractive power on the object side of the first lens component becomes a positive refractive power. By doing so, since an effect of converging a light beam immediately before the first lens component is enhanced, it is possible to make the first lens component small-sized, as well as to improve the sensitivity of the image-plane shift. As a result of this, it becomes easy make small the diameter of the image-blur correcting unit, and also, it is possible to improve the sensitivity of the image-plane shift.

Moreover, it is preferable that the zoom lens according to the present embodiment includes a fourth lens unit, and the following conditional expression (16) is satisfied.

$$0.00 < |f_3/f_4| < 2.00 \quad (16)$$

where, $f_3$ denotes the focal length of the third lens unit, and
$f_4$ denotes a focal length of the fourth lens unit.

By making so as not to fall below a lower limit value of conditional expression (16), it is possible to suppress an increase in the spherical aberration and an increase in a coma in the third lens unit. By making so as not to exceed an upper limit value of conditional expression (16), it is possible to suppress mainly an increase in the spherical aberration and an increase in the coma in the fourth lens unit. As a result, it becomes easy to secure an imaging performance near the telephoto end in particular.

Moreover, it is preferable that the zoom lens according to the present embodiment includes a fourth lens unit, and the predetermined lens is a fifth lens unit, and the following conditional expression (17) is satisfied.

$$0.00<|f_4/f_5|<2.00 \qquad (17)$$

where, $f_4$ denotes a focal length of the fourth lens unit, and
$f_5$ denotes a focal length of the fifth lens unit.

By making so as not to fall below a lower limit value of conditional expression (17), it is possible to suppress an increase in a negative distortion in the fifth lens unit. By making so as not to exceed an upper limit value of conditional expression (17), it is possible to suppress an increase in a height of a light ray on the image side of the fourth lens unit. As a result, making a diameter of the optical system small becomes easy.

Moreover, in the zoom lens according to the present embodiment, it is preferable that the second lens unit includes a first sub-unit and a second sub-unit, and the following conditional expression (18) is satisfied.

$$0.00<|f_{2a}/f_{2b}|<2.00 \qquad (18)$$

where, $f_{2a}$ denotes the focal length of the first sub-unit, and
$f_{2b}$ denotes a focal length of the second sub-unit.

By making so as not to fall below a lower limit value of conditional expression (18), the refractive power of the second sub-unit does not become excessively small. As a result, since a degradation of a focusing sensitivity is suppressed, a focusing range does not become narrow. By making so as not to exceed an upper limit value of conditional expression (18), it is possible to suppress an increase in the diameter of the second lens unit. As a result, small-sizing of the optical system becomes easy.

Moreover, in the zoom lens according to the present embodiment, the first lens unit includes in order from the object side to the image side, a negative meniscus lens having a convex surface directed toward the object side, a positive meniscus lens having a convex surface directed toward the object side, and a positive meniscus lens having a convex surface directed toward the object side.

By making such arrangement, it is possible to prevent a sharp bending of a marginal ray that passes through the first lens unit, particularly a sharp bending of a marginal ray near the wide angle end. As a result, it is possible to correct the astigmatism favorably. Moreover, it is possible to correct favorably the spherical aberration in the first lens unit near the telephoto end.

Moreover, in the zoom lens according to the present embodiment, it is preferable that the second lens unit includes in order from the object side to the image side, a negative lens, a negative lens, a positive lens, and a negative lens.

As aforementioned, at a position nearest to the object in the second lens unit, a change in the height of a light ray at the time of zooming becomes large. When the change in the height of a light ray is large, a change in an angle of refraction of a light ray at a lens nearest to the object also becomes sharp. Therefore, two negative lenses are to be disposed at the position nearest to the object in the second lens unit. By doing so, it is possible to lessen the sharp change in the angle of refraction of a light ray at a lens surface at the time of zooming. As a result, it is possible to reduce a fluctuation in the curvature of field at the time of zooming, as well as to make the negative refractive power of the overall second lens unit large.

Moreover, the positive lens and the negative lens are to be disposed on the image side of the two negative lenses. The spherical aberration and the curvature of field are susceptible to occur in the two negative lenses positioned on the object side of the positive lens. Therefore, by the positive lens and the negative lens, it is possible to correct favorably the spherical aberration and the curvature of field that occur in the two negative lenses.

Moreover, in the zoom lens according to the present embodiment, it is preferable that a negative meniscus lens having a convex surface directed toward the object side is disposed nearest to the object in the second lens unit.

By making such arrangement, it is possible to lessen the sharp change in the angle of refraction of a light ray at a lens surface at the time of zooming. As a result, it is possible reduce a fluctuation in the curvature of field at the time of zooming.

Moreover, in the zoom lens according to the present embodiment, it is preferable that the second lens unit includes in order from the object side to the image side, a negative meniscus lens having a convex surface directed toward the object side, a biconcave negative lens, a biconvex positive lens, and a negative lens having an object-side surface which is a concave surface directed toward the object side.

As aforementioned, at a position nearest to the object in the second lens unit, a change in the height of a light ray at the time of zooming becomes large. When the change in the height of a light ray is large, a change in an angle of refraction of a light ray at a lens nearest to the object also becomes sharp. Therefore, the negative lens having a concave surface directed toward the image side is to be disposed at the position nearest to the object in the second lens unit. By doing so, it is possible to lessen the sharp change in the angle of refraction of a light ray at the lens surface at the time of zooming. As a result, it is possible to reduce a fluctuation in the curvature of field at the time of zooming.

Moreover, by disposing a negative lens having a concave surface directed toward the object side, on the image side of the negative lens nearest to the object, it is possible to make the negative refractive power of the overall second lens unit large.

Moreover, a positive lens having a convex surface directed toward the image side is to be disposed on the image side of the negative lens. The spherical aberration and the curvature of field are susceptible to occur in two negative lenses disposed on the object side of the positive lens. Therefore, in the positive lens, it is possible to correct favorably the spherical aberration and the curvature of field occurring in the two negative lenses. Moreover, it is possible to correct the chromatic aberration favorably.

Moreover, in the zoom lens according to the present embodiment, it is preferable that the third lens unit includes in order from the object side to the image side, a positive lens, a positive lens, a negative lens, and a positive lens.

By sharing the positive refractive power of the third lens unit by a plurality of positive lenses, it is possible to make the refractive power of the third lens unit large, as well as to improve an effect of correcting the chromatic aberration. Accordingly, even when the refractive power of the third lens unit is made large, it is possible to reduce an amount of the spherical aberration and the coma that occur. As a result, a favorable imaging performance is achieved throughout the entire zoom range.

Moreover, in the zoom lens according to the present embodiment, it is preferable that both of a lens disposed nearest to an object side and a lens disposed nearest to an image in the third lens unit are biconvex positive lenses.

In the third lens unit, the change in the height of a light ray at the time of zooming becomes large. When the change in the height of a light ray is large, the change in the angle of refraction of a light ray also becomes sharp. Therefore, by making such an arrangement, it is possible to lessen the sharp change in the angle of refraction of a light ray at the lens surface at the time of zooming. As a result, it is possible to make the refractive power of the third lens unit large while suppressing mainly an occurrence of the spherical aberration.

Moreover, in the zoom lens according to the present embodiment, it is preferable that the third lens unit includes in order from the object side to the image side, a biconvex positive lens, a positive lens having an image-side surface which is a convex surface directed toward the image side, a negative lens having an image-side surface which is a concave surface directed toward the image side, and a biconvex positive lens.

By sharing the positive refractive power of the third lens unit by a plurality of positive lenses, it is possible to make the refractive power of the third lens unit large, as well as to improve an effect of correcting the chromatic aberration. Accordingly, even when the refractive power of the third lens unit is made large, it is possible to reduce an amount of the spherical aberration and the coma that occur. As a result, a favorable imaging performance is achieved throughout the entire zoom range.

Moreover, an image pickup apparatus according to the present embodiment includes one of the zoom lenses described above, and an image pickup element which has an image pickup surface.

By making such arrangement, it is possible to provide an image pickup apparatus which enables to capture an image for which, an angle of view on a wide angle side and a range of an angle of view that can be photographed are wide, and an image blur is less.

Regarding each conditional expression, it is preferable to make that function more assured by restricting one of or both of the lower limit value and the upper limit value. Moreover, regarding each conditional expression, only an upper limit value or a lower limit value of a numerical range of a further restricted conditional expression may be restricted.

Preferable lower limit value and upper limit value for conditional expression (1) are as follows.
Lower limit value: 3.5, 3.7, 3.9, 4.2
Upper limit value: 8.4, 8.5, 7.7, 7.5, 7.1
Preferable lower limit value and upper limit value for conditional expression (2) are as follows.
Lower limit value: 5.5, 6.0, 6.8, 7.5
Upper limit value: 17.4, 15.0, 14.7, 13.0, 12.1, 12.0
Preferable lower limit value and upper limit value for conditional expression (3) are as follows.
Lower limit value: 0.4, 0.5, 0.6
Upper limit value: 3.7, 2.8, 1.8, 1.7, 1.2
Preferable lower limit value and upper limit value for conditional expression (4) are as follows.
Lower limit value: 8, 9, 12, 15
Upper limit value: 43, 38, 32, 25
Preferable lower limit value and upper limit value for conditional expression (5) are as follows.
Lower limit value: 1.79, 1.80, 1.81, 1.83, 1.85, 1.86
Upper limit value: 2.20, 2.09, 1.99

Preferable lower limit value and upper limit value for conditional expression (6) are as follows.
Lower limit value: 71.6, 72.6, 73.7
Upper limit value: 93.9, 89.8, 85.7
Preferable lower limit value and upper limit value for conditional expression (7) are as follows.
Lower limit value: 71.6, 72.6, 73.7
Upper limit value: 93.9, 89.8, 85.7
Preferable lower limit value and upper limit value for conditional expression (8) are as follows.
Lower limit value: 0.06, 0.08, 0.11
Upper limit value: 1.43, 1.35, 1.28
Preferable lower limit value and upper limit value for conditional expression (9) are as follows.
Lower limit value: −2.0, −1.7, −1.5, −1.0, −0.7
Upper limit value: 0.2, 0.1, 0.0, −0.1, −0.3
Preferable lower limit value and upper limit value for conditional expression (10) are as follows.
Lower limit value: −0.010, −0.005
Upper limit value: 0.014, 0.013
Preferable lower limit value and upper limit value for conditional expression (11) are as follows.
Lower limit value: −0.011, −0.010
Upper limit value: 0.055, 0.052, 0.050, 0.044, 0.036
Preferable lower limit value and upper limit value for conditional expression (12) are as follows.
Lower limit value: 58.0, 60.0, 70.5, 76.0, 80.0
Upper limit value: 93.9, 89.8, 85.7, 81.5
Preferable lower limit value and upper limit value for conditional expression (13) are as follows.
Lower limit value: 16, 17, 20, 22
Upper limit value: 31, 30, 29, 27
Preferable lower limit value and upper limit value for conditional expression (14) are as follows.
Lower limit value: 71.6, 72.6, 73.7, 74.0, 80.0
Upper limit value: 93.9, 89.8, 85.7
Preferable lower limit value and upper limit value for conditional expression (15) are as follows.
Lower limit value: 1.2, 1.3, 1.4
Upper limit value: 2.8, 2.7, 2.6, 2.5, 2.2
Preferable lower limit value and upper limit value for conditional expression (16) are as follows.
Lower limit value: 0.02, 0.04, 0.07
Upper limit value: 1.69, 1.38, 1.07
Preferable lower limit value and upper limit value for conditional expression (17) are as follows.
Lower limit value: 0.14, 0.28, 0.42
Upper limit value: 1.64, 1.28, 0.93
Preferable lower limit value and upper limit value for conditional expression (18) are as follows.
Lower limit value: 0.23, 0.46, 0.69
Upper limit value: 1.74, 1.47, 1.21

Examples of zoom lenses will be described below in detail by referring to the accompanying diagrams. However, the present invention is not restricted to the examples described below.

Examples from an example 1 to an example 4 of the zoom lens will be described below. Lens cross-sectional views of the zoom lenses in the examples from the example 1 to the example 4 are shown in FIG. 1A, FIG. 1B, and FIG. 1C to FIG. 4A, FIG. 4B, and FIG. 4C. FIG. 1A, FIG. 2A, FIG. 3A, and FIG. 4A are lens cross-sectional views at a wide angle end, FIG. 1B, FIG. 2B, FIG. 3B, and FIG. 4B are lens cross-sectional views in an intermediate focal length state, and FIG. 1C, FIG. 2C, FIG. 3C, and FIG. 4C are lens cross-sectional views at a telephoto end. Each of the lens cross-sectional views is a lens cross-sectional view at the time of focusing to an object at infinity.

Moreover, a first lens unit is denoted by G1, a second lens unit is denoted by G2, a third lens unit is denoted by G3, a fourth lens unit is denoted by G4, a fifth lens unit is denoted by G5, an aperture stop is denoted by S, and an image plane (an image pickup plane) is denoted by I. Moreover, a lens unit which moves at the time of focusing is indicated by an arrow in a horizontal direction, and a lens unit which moves at the time of correcting an image-blur is indicated by an arrow in a vertical direction.

Moreover, a parallel and flat plate that forms a low-pass filter or a cover glass of an electronic image pickup element may be disposed between a lens unit located at nearest to an image and the image plane I. In this case, a wavelength region restricting coating which restricts infrared light may be applied to a surface of the flat and parallel plate. Moreover, a multilayer film for restricting wavelength region may be applied to a surface of the cover glass. The cover glass may be imparted an effect of a low-pass filter.

Figure 1B:
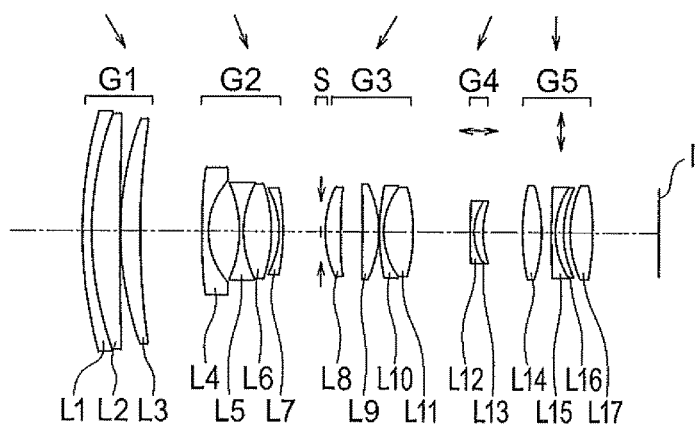
Figure 1C:
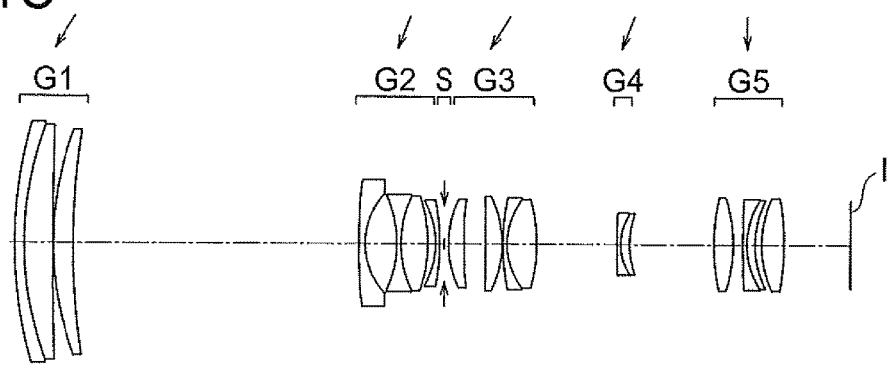

The zoom lens according to the example 1, as shown in FIG. 1A, FIG. 1B, and FIG. 1C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens L8, a positive meniscus lens L9 having a convex surface directed toward the image side, a negative meniscus lens L10 having a convex surface directed toward the object side, and a biconvex positive lens L11. Here, the negative meniscus lens L10 and the biconvex positive lens L11 are cemented.

The fourth lens unit G4 includes a negative meniscus lens L12 having a convex surface directed toward the object side, and a positive meniscus lens L13 having a convex surface directed toward the object side. Here, the negative meniscus lens L12 and the positive meniscus lens L13 are cemented.

The fifth lens unit G5 includes a biconvex positive lens L14, a negative meniscus lens L15 having a convex surface directed toward the object side, a positive meniscus lens L16 having a convex surface directed toward the object side, and a biconvex positive lens L17. Here, the negative meniscus lens L15 and the positive meniscus lens L16 are cemented.

At the time of zooming from a wide angle end to a telephoto end, the first lens unit G1, after moving toward the image side, moves toward the object side, the second lens unit G2, after moving toward the image side, moves toward the object side, the third lens unit G3 moves toward the object side, the fourth lens unit G4 moves toward the object side, and the fifth lens unit G5 is fixed. The aperture stop S moves together with the third lens unit G3.

At the time of focusing, the fourth lens unit G4 moves along an optical axis. More elaborately, at the time of focusing form an object at infinity to an object at a close distance, the fourth lens unit G4 moves toward the image side. Moreover, at the time of correcting an image-blur, the negative meniscus lens L15 and the positive meniscus lens L16 in the fifth lens unit G5 move in a direction orthogonal to the optical axis.

An aspheric surface is provided to a total of six surfaces namely, both surfaces of the negative meniscus lens L4, both surfaces of the biconvex positive lens L8, an object-side surface of the negative meniscus lens L12, and an object-side surface of the negative meniscus lens L15.

Figure 2A:
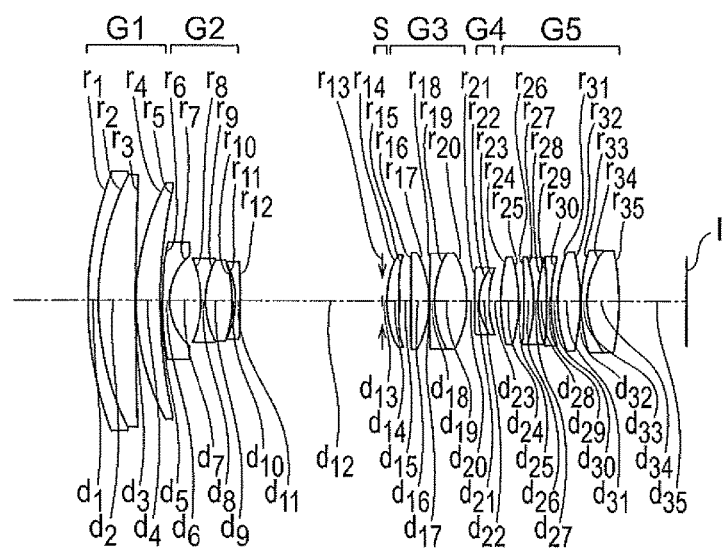
FIG. 2A, FIG. 2B, and FIG. 2C are lens cross-sectional views at the time of focusing to an object at infinity of a zoom lens according to an example 2.
Figure 2B:
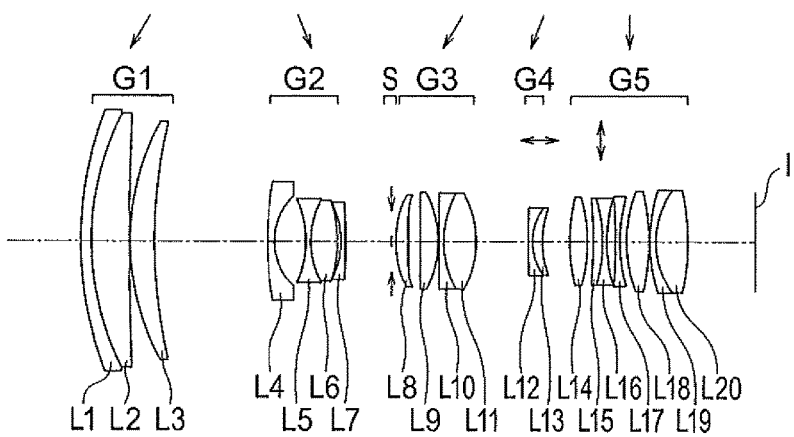
Figure 2C:
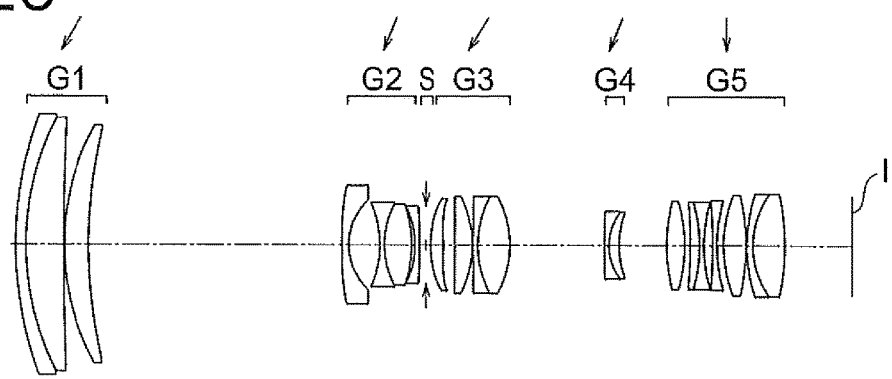

The zoom lens according to the example 2, as shown in FIG. 2A, FIG. 2B, and FIG. 2C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L17 having a convex surface directed toward an image side. Here, the biconcave negative lens L5 and the biconvex positive lens L6 are cemented.

The third lens unit G3 includes a biconvex positive lens L8, a biconvex positive lens L9, a negative meniscus lens L10 having a convex surface directed toward the object side, and a biconvex positive lens L11. Here, the negative meniscus lens L10 and the biconvex positive lens L11 are cemented.

The fourth lens unit G4 includes a negative meniscus lens L12 having a convex surface directed toward the object side and a positive meniscus lens L13 having a convex surface directed toward the object side. Here, the negative meniscus lens L12 and the positive meniscus lens L13 are cemented.

The fifth lens unit G5 includes a biconvex positive lens L14, a positive meniscus lens L15 having a convex surface directed toward the image side, a biconcave negative lens L16, a biconcave negative lens L17, a biconvex positive lens L18, a negative meniscus lens L19 having a convex surface directed toward the object side, and a biconvex positive lens L20. Here, the positive meniscus lens L15 and the biconcave negative lens L16 are cemented. Moreover, the negative meniscus lens L19 and the biconvex positive lens L20 are cemented.

At the time of zooming from a wide angle end to a telephoto end, the first lens unit G1 moves toward the object side, the second lens unit G2, after moving toward the image side, moves toward the object side, the third lens unit G3 moves toward the object side, the fourth lens unit G4 moves toward the object side, and the fifth lens unit G5 is fixed. The aperture stop S moves together with the third lens unit G3.

At the time of focusing, the fourth lens unit G4 moves along an optical axis. More elaborately, at the time of focusing from an object at infinity to an object at a close distance, the fourth lens unit G4 moves toward the image side. Moreover, at the time of correcting an image-blur, the positive meniscus lens L15, the biconcave negative lens L16, and the biconcave negative lens L17 in the fifth lens unit G5 move in a direction orthogonal to the optical axis.

An aspheric surface is provided to a total of five surfaces namely, both surfaces of the negative meniscus lens L4, both surfaces of the biconvex positive lens L8, and an object-side surface of the negative meniscus lens L12.

Figure 3A:
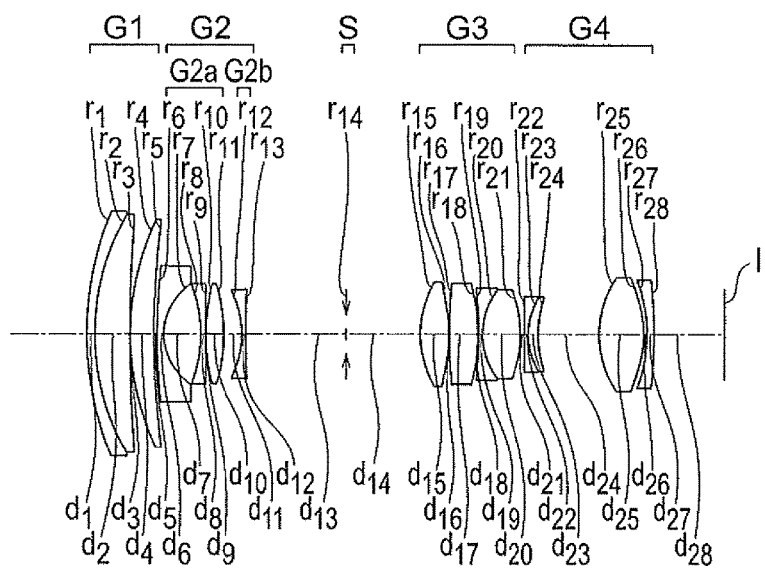
FIG. 3A, FIG. 3B, and FIG. 3c are lens cross-sectional views at the time of focusing to an object at infinity of a zoom lens according to an example 3.
Figure 3B:
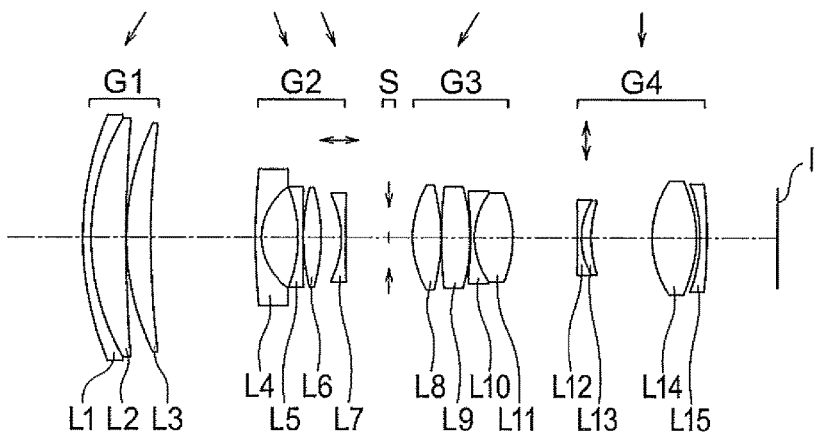
Figure 3C:
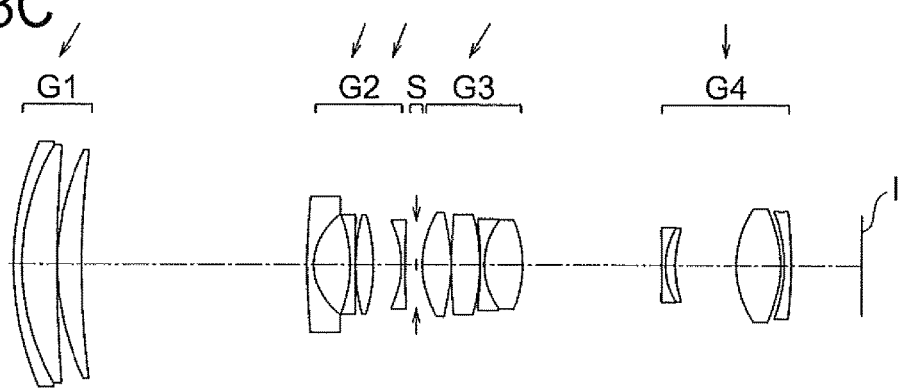

The zoom lens according to the example 3, as shown in FIG. 3A, FIG. 3B, and FIG. 3C, includes in order from an object side, a first lens unit G1 having a positive refractive power, a second lens unit G2 having a negative refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a first sub-unit G2a and a second sub-unit G2b. The first sub-unit G2a includes a negative meniscus lens L4 having a convex surface directed toward the object side, a biconcave negative lens L5, and a biconvex positive lens L6. The second sub-unit G2b includes a biconcave negative lens L7.

The third lens unit G3 includes a biconvex positive lens L8, a biconvex positive lens L9, a biconcave negative lens L10, and a biconvex positive lens L11. Here, the biconcave negative lens L10 and the biconvex positive lens L11 are cemented.

The fourth lens unit G4 includes a biconcave negative lens L12, a positive meniscus lens L13 having a convex surface directed toward the object side, a biconvex positive lens L14, and a negative meniscus lens L15 having a convex surface directed toward an image side. Here, the biconcave negative lens L12 and the positive meniscus lens L13 are cemented.

At the time of zooming from a wide angle end to a telephoto end, the first lens unit G1 moves toward the object side, the first sub-unit G2a, after moving toward the image side, moves toward the object side, the second sub-unit G2b, after moving toward the image side, moves toward the object side, the third lens unit G3 moves toward the object side, and the fourth lens unit G4 is fixed. The aperture stop S moves independently toward the object side.

At the time of focusing, the second sub-unit G2b moves along an optical axis. More elaborately, at the time of focusing from an object at infinity to an object at a close distance, the second sub-unit G2b moves toward the object side. Moreover, at the time of correcting an image-blur, the biconcave negative lens L12 and the positive meniscus lens L13 in the fourth lens unit G4 move in a direction orthogonal to the optical axis.

An aspheric surface is provided to a total of nine surfaces namely, both surfaces of the negative meniscus lens L4, both surfaces of the biconcave negative lens L7, both surfaces of the biconvex positive lens L8, an object-side surface of the biconcave negative lens L12, and both surfaces of the biconvex positive lens L14.

Figure 4A:
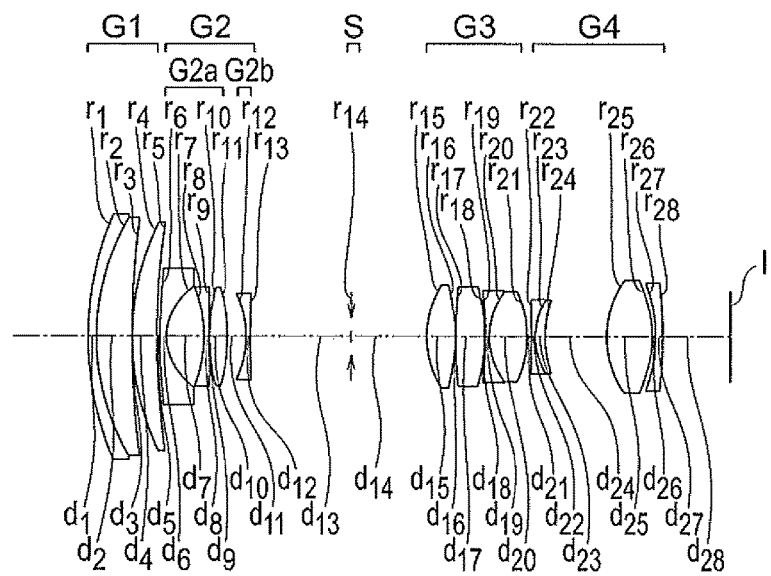
FIG. 4A, FIG. 4B, and FIG. 4C are lens cross-sectional views at the time of focusing to an object at infinity of a zoom lens according to an example 4.
Figure 4B:
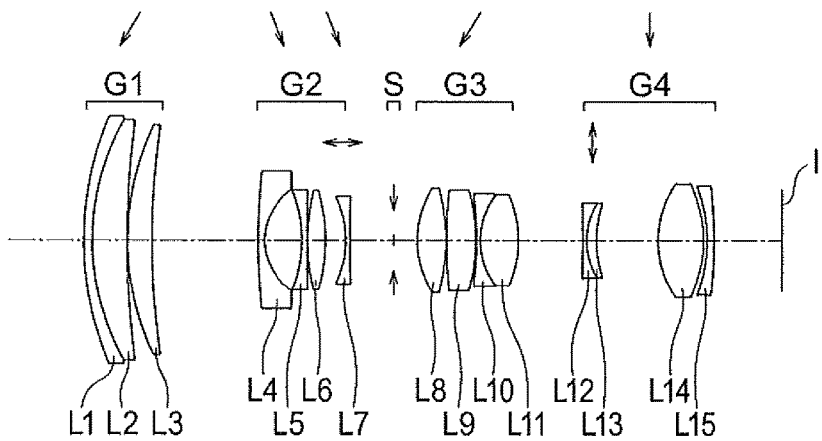
Figure 4C:
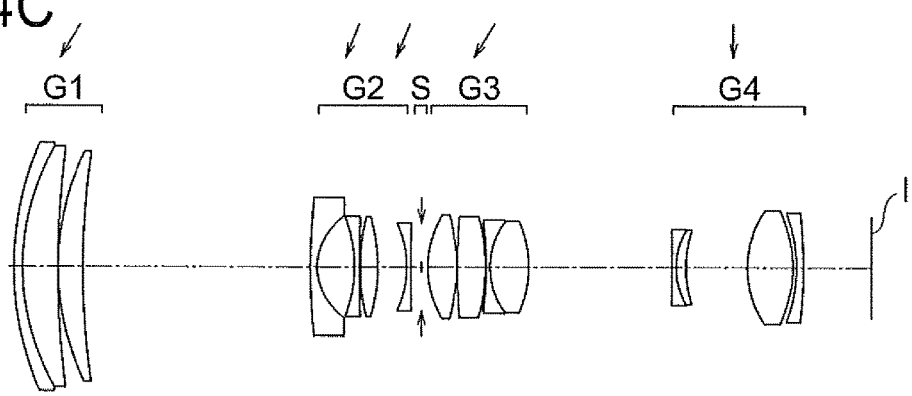
Figure 6A:
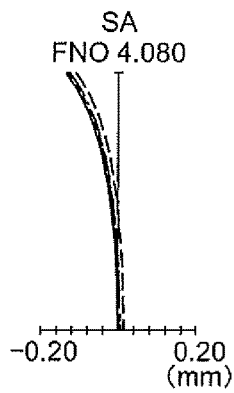
FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are aberration diagrams at the time of focusing to an object at infinity of the zoom lens according to the example 2.
Figure 6B:
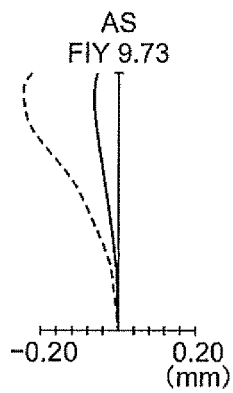
Figure 6C:
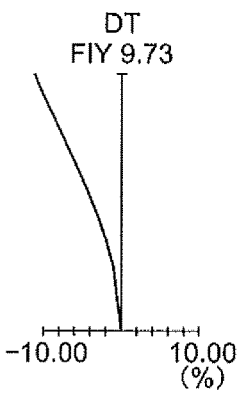
Figure 6D:
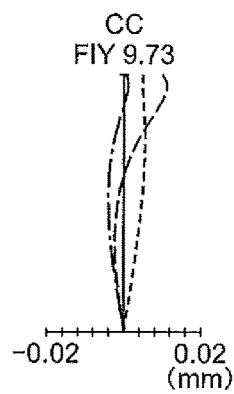
Figure 6E:
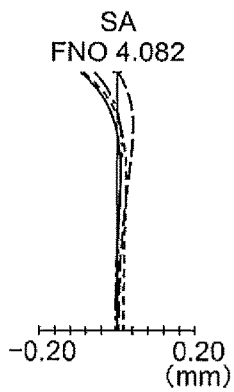
Figure 6F:
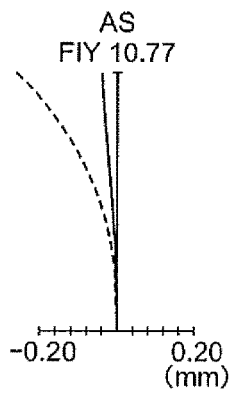
Figure 6G:
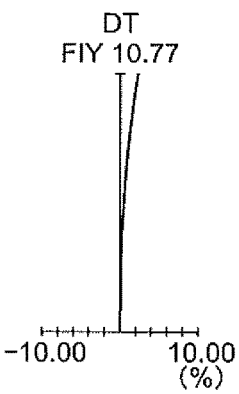
Figure 6H:
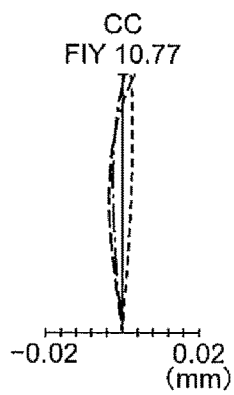
Figure 6I:
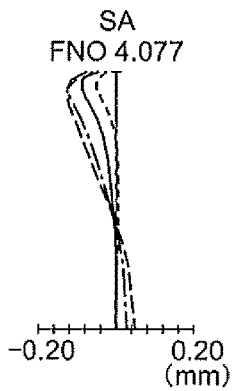
Figure 6J:
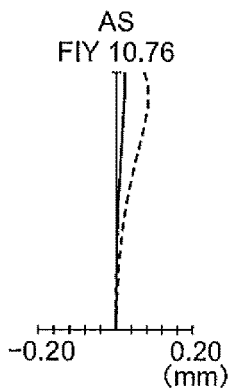
Figure 6K:
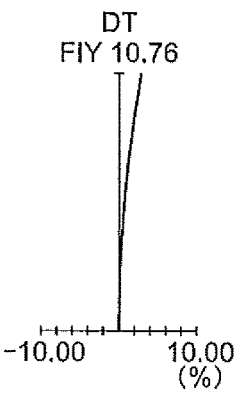
Figure 6L:
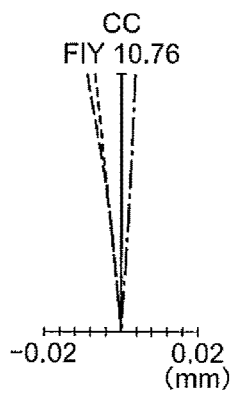

The zoom lens according to the example 4, as shown in FIG. 4A, FIG. 4B, and FIG. 4C, includes in order from an object side, a first lens unit G1 having a positive refractive power, a second lens unit G2 having a negative refractive power, a third lens unit G3 having a positive refractive power, and a fourth lens unit G4 having a positive refractive power. An aperture stop is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a first sub-unit G2a and a second sub-unit G2b. The first sub-unit G2a includes a negative meniscus lens L4 having a convex surface directed toward the object side, a biconcave negative lens L5, and a biconvex positive lens L6. The second sub-unit G2b includes a biconcave negative lens L7.

The third lens unit G3 includes a biconvex positive lens L8, a biconvex positive lens L9, a biconcave negative lens L10, and a biconvex positive lens L11. Here, the biconcave negative lens L10 and the biconvex positive lens L11 are cemented.

The fourth lens unit G4 includes a biconcave negative lens L12, a positive meniscus lens L13 having a convex surface directed toward the object side, a biconvex positive lens L14, and a negative meniscus lens L15 having a convex surface directed toward an image side. Here, the biconcave negative lens L12 and the positive meniscus lens L13 are cemented.

At the time of zooming from a wide angle end to a telephoto end, the first lens unit G1 moves toward the object side, the first sub-unit G2a, after moving toward the image side, moves toward the object side, the second sub-unit G2b, after moving toward the image side, moves toward the object side, the third lens unit G3 moves toward the object side, and the fourth lens unit G4 is fixed. The aperture stop S moves independently toward the object side.

At the time of focusing, the second sub-unit G2b moves along an optical axis. More elaborately, at the time of focusing from an object at infinity to an object at a close distance, the second sub-unit G2b moves toward the object side. Moreover, at the time of correcting an image-blur, the biconcave negative lens L12 and the positive meniscus lens L13 in the fourth lens unit G4 move in a direction orthogonal to the optical axis.

An aspheric surface is provided to a total of 10 surfaces namely, both surfaces of the negative meniscus lens L4, both surfaces of the biconcave negative lens L7, both surfaces of the biconvex positive lens L8, an image-side surface of the biconvex positive lens L11, an object-side surface of the biconcave negative lens L12, and both surfaces of the biconvex positive lens L14.

Next, numerical data of optical components comprising the zoom lens of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, v1, vd2, . . . denotes an Abbe number of each lens, * denotes an aspheric surface. Moreover, in zoom data and, f denotes a focal length of the overall zoom lens system, FNO. denotes an F number, ω denotes a half angle of view, IH denotes an image height, BF denotes a back focus, and each of f1, f2 . . . is a focal length of each lens unit. Further, back focus is a unit which is expressed upon air conversion of a distance from a rearmost lens surface to a paraxial image surface. The lens total length (LTL) is a distance from a frontmost lens surface to the rearmost lens surface plus back focus. Moreover, WE denotes a wide angle end, ST denotes an intermediate state, TE denotes a telephoto end. The numerical data are numerical data at a time of focusing to an object at infinity.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12 . . .

$$Z=(y^2/r)/[1+\{1-(1+k)(y/r)^2\}^{1/2}]+A4y^4+A6y^6+A8y^8+A10y^{10}+A12y^{12}+ \ldots$$

Further, in the aspherical surface coefficients, 'e–n' (where, n is an integral number) indicates '$10^{-n}$'. Moreover, these symbols are commonly used in the following numerical data for each example.

Example 1

| | Unit mm | | | |
|---|---|---|---|---|
| | Surface data | | | |
| Surface no. | r | d | nd | vd |
| 1 | 111.910 | 2.250 | 1.85478 | 24.80 |
| 2 | 84.831 | 6.888 | 1.49700 | 81.54 |
| 3 | 1062.746 | 0.150 | | |
| 4 | 81.135 | 4.788 | 1.49700 | 81.54 |
| 5 | 191.519 | Variable | | |
| 6* | 459.062 | 1.500 | 1.88202 | 37.22 |
| 7* | 17.961 | 7.677 | | |
| 8 | −29.044 | 1.000 | 1.70154 | 41.24 |
| 9 | 26.622 | 6.689 | 2.00069 | 25.46 |
| 10 | −36.383 | 1.886 | | |
| 11 | −21.481 | 1.000 | 1.88300 | 40.76 |
| 12 | −55.189 | Variable | | |
| 13(Stop) | ∞ | 1.000 | | |
| 14* | 26.975 | 3.790 | 1.58313 | 59.38 |
| 15* | −2309.789 | 5.234 | | |
| 16 | −424.469 | 3.909 | 1.49700 | 81.54 |
| 17 | −27.528 | 0.200 | | |
| 18 | 57.112 | 1.000 | 1.74077 | 27.79 |
| 19 | 18.222 | 7.206 | 1.49700 | 81.54 |
| 20 | −41.721 | Variable | | |
| 21* | 189.338 | 0.900 | 1.80610 | 40.92 |
| 22 | 13.844 | 2.196 | 1.80810 | 22.76 |
| 23 | 22.154 | Variable | | |
| 24 | 52.938 | 4.732 | 1.49700 | 81.54 |
| 25 | −37.941 | 2.395 | | |
| 26* | 338.438 | 0.900 | 1.80610 | 40.92 |
| 27 | 20.646 | 1.960 | 1.80810 | 22.76 |
| 28 | 24.756 | 1.595 | | |
| 29 | 27.418 | 5.491 | 1.48749 | 70.23 |
| 30 | −65.872 | | | |

Aspherical surface data

6th surface k = 0.0000
A4 = 3.7729e−006, A6 = 8.2311e−008, A8 = −4.0100e−010,
A10 = 6.4707e−013, A12 = 0.0000e+000

7th surface k = 0.0000
A4 = −9.0338e−006, A6 = 4.8510e−008, A8 = 4.9964e−010,
A10 = −4.6700e−012, A12 = 0.0000e+000

-continued

| Unit mm |
|---|

14th surface k = 0.0000
A4 = 5.8905e−006, A6 = 1.3995e−008, A8 = −1.5510e−011,
A10 = 0.0000e+000, A12 = 0.0000e+000

15th surface k = 0.0000
A4 = 3.9440e−005, A6 = 2.4403e−008, A8 = −6.7933e−011,
A10 = 0.0000e+000, A12 = 0.0000e+000

21th surface k = 0.0000
A4 = −2.0409e−006, A6 = 7.5819e−010, A8 = 2.9761e−011,
A10 = 0.0000e+000, A12 = 0.0000e+000

26th surface k = 0.0000
A4 = −1.8749e−006, A6 = 6.5424e−009, A8 = −7.2311e−012,
A10 = 0.0000e+000, A12 = 0.0000e+000

| Zoom data | | | |
|---|---|---|---|
| | WE | ST | TE |
| f | 12.283 | 34.650 | 98.501 |
| Fno. | 4.080 | 4.080 | 4.078 |
| 2ω | 83.2 | 33.7 | 12.1 |
| IH | 9.77 | 10.77 | 10.76 |
| FB | 16.324 | 16.324 | 16.324 |
| LTL | 140.682 | 140.476 | 203.362 |
| d5 | 0.600 | 15.147 | 69.590 |
| d12 | 42.474 | 9.145 | 1.094 |
| d20 | 1.984 | 14.012 | 19.446 |
| d23 | 2.963 | 9.511 | 20.570 |

| Unit focal length | | | |
|---|---|---|---|
| f1 = 153.415 | f2 = −16.545 | f3 = 23.885 | f4 = −31.445 |
| f5 = 56.580 | $f_{IS}$ = −33.291 | $f_{GSb}$ = 40.495 | |

Example 2

| | Unit mm | | | |
|---|---|---|---|---|
| | Surface data | | | |
| Surface no. | r | d | nd | vd |
| 1 | 81.604 | 2.250 | 1.85478 | 24.80 |
| 2 | 62.092 | 8.144 | 1.49700 | 81.54 |
| 3 | 701.981 | 0.150 | | |
| 4 | 55.484 | 5.211 | 1.49700 | 81.54 |
| 5 | 113.234 | Variable | | |
| 6* | 135.727 | 1.500 | 1.88202 | 37.22 |
| 7* | 14.056 | 6.845 | | |
| 8 | −22.420 | 1.000 | 1.69680 | 55.53 |
| 9 | 19.210 | 5.822 | 2.00100 | 29.13 |
| 10 | −27.768 | 0.729 | | |
| 11 | −19.052 | 1.000 | 1.88300 | 40.76 |
| 12 | −136.592 | Variable | | |
| 13(Stop) | ∞ | 1.000 | | |
| 14* | 27.524 | 2.702 | 1.58313 | 59.38 |
| 15* | −157.735 | 2.481 | | |
| 16 | 1402.695 | 3.837 | 1.49700 | 81.54 |
| 17 | −23.561 | 0.200 | | |
| 18 | 728.744 | 1.000 | 1.74077 | 27.79 |
| 19 | 23.023 | 6.953 | 1.49700 | 81.54 |
| 20 | −22.280 | Variable | | |
| 21* | 238.879 | 0.900 | 1.80610 | 40.92 |
| 22 | 12.341 | 2.157 | 1.80810 | 22.76 |
| 23 | 21.212 | Variable | | |
| 24 | 39.813 | 3.913 | 1.49700 | 81.54 |

-continued

Unit mm

| 25 | −34.521 | 1.293 | | |
| 26 | −100.711 | 2.029 | 1.80810 | 22.76 |
| 27 | −33.629 | 0.900 | 1.59282 | 68.62 |
| 28 | 35.675 | 1.833 | | |
| 29 | −121.577 | 0.900 | 1.77250 | 49.60 |
| 30 | 36.543 | 1.417 | | |
| 31 | 30.913 | 4.964 | 1.49700 | 81.54 |
| 32 | −48.312 | 0.200 | | |
| 33 | 37.497 | 1.300 | 1.92119 | 23.96 |
| 34 | 19.614 | 6.886 | 1.48749 | 70.23 |
| 35 | −53.176 | | | |

Aspherical surface data

6th surface k = 0.0000
A4 = 1.2988e−005, A6 = 1.2693e−007, A8 = −1.0541e−009,
A10 = 2.7053e−012, A12 = 0.0000e+000

7th surface k = 0.0000
A4 = 1.9823e−006, A6 = 1.4018e−007, A8 = 2.0016e−009,
A10 = −2.1018e−011, A12 = 0.0000e+000

14th surface k = 0.0000
A4 = 2.6492e−005, A6 = 1.2050e−007, A8 = 1.0185e−009,
A10 = −4.2548e−013, A12 = 0.0000e+000

15th surface k = 0.0000
A4 = 8.7485e−005, A6 = 1.8179e−007, A8 = 8.6259e−010,
A10 = 0.0000e+000, A12 = 0.0000e+000

21th surface k = 0.0000
A4 = −6.5574e−006, A6 = 2.1171e−008, A8 = 2.1192e−011,
A10 = 0.0000e+000, A12 = 0.0000e+000

Zoom data

| | WE | ST | TE |
|---|---|---|---|
| f | 12.371 | 34.618 | 98.421 |
| Fno. | 4.080 | 4.082 | 4.077 |
| 2ω | 83.0 | 33.8 | 12.1 |
| IH | 9.73 | 10.77 | 10.76 |
| FB | 14.673 | 14.673 | 14.673 |
| Lens total length | 129.710 | 146.007 | 180.969 |
| d5 | 0.600 | 24.757 | 54.714 |
| d12 | 30.615 | 9.961 | 1.430 |
| d20 | 1.732 | 11.180 | 20.258 |
| d23 | 2.573 | 5.919 | 10.376 |

Unit focal length

| f1 = 115.101 | f2 = −12.120 | f3 = 20.248 | f4 = −29.125 |
| f5 = 51.180 | $f_{IS}$ = −21.140 | $f_{GSb}$ = 27.807 | |

Example 3

Unit mm

Surface data

| Surface no. | r | d | nd | νd |
|---|---|---|---|---|
| 1 | 69.248 | 1.800 | 2.00100 | 29.13 |
| 2 | 52.789 | 7.500 | 1.49700 | 81.61 |
| 3 | 328.330 | 0.100 | | |
| 4 | 57.884 | 5.214 | 1.49700 | 81.61 |

-continued

Unit mm

| 5 | 198.567 | Variable | | |
| 6* | 119.294 | 1.400 | 1.88202 | 37.22 |
| 7* | 12.115 | 8.000 | | |
| 8 | −29.183 | 1.100 | 1.59282 | 68.63 |
| 9 | 461.667 | 0.100 | | |
| 10 | 43.964 | 3.909 | 1.85478 | 24.80 |
| 11 | −38.517 | Variable | | |
| 12* | −19.860 | 0.900 | 1.49700 | 81.54 |
| 13* | 436.011 | Variable | | |
| 14(Stop) | ∞ | Variable | | |
| 15* | 21.125 | 6.196 | 1.61881 | 63.85 |
| 16* | −34.217 | 0.100 | | |
| 17 | 122.976 | 6.064 | 1.49700 | 81.61 |
| 18 | −42.576 | 0.100 | | |
| 19 | −80.617 | 0.800 | 1.91082 | 35.25 |
| 20 | 16.371 | 8.248 | 1.49700 | 81.54 |
| 21 | −25.567 | Variable | | |
| 22* | −303.081 | 0.800 | 1.76802 | 49.24 |
| 23 | 15.847 | 2.100 | 1.80810 | 22.76 |
| 24 | 26.006 | 13.081 | | |
| 25* | 22.916 | 9.800 | 1.49700 | 81.54 |
| 26* | −22.681 | 0.701 | | |
| 27 | −32.933 | 1.523 | 1.91082 | 35.25 |
| 28 | −107.492 | | | |

Aspherical surface data

6th surface k = 0.0000
A4 = −7.0773e−006, A6 = 7.8081e−009, A8 = 1.9471e−010,
A10 = −1.2393e−012, A12 = 2.4350e−015

7th surface k = 0.0000
A4 = −4.3159e−005, A6 = −2.2982e−008, A8 = −4.7731e−009,
A10 = 5.0846e−011, A12 = −2.9867e−013

12th surface k = 0.0000
A4 = 1.2716e−005, A6 = 1.0413e−007, A8 = 3.1045e−010,
A10 = −1.6671e−011, A12 = 1.4128e−013

13th surface k = 0.0000
A4 = 1.1189e−006, A6 = 1.0070e−007, A8 = −6.7178e−010,
A10 = −4.0044e−012, A12 = 5.8055e−014

15th surface k = 0.0000
A4 = −2.2215e−005, A6 = 4.1983e−008, A8 = −2.1886e−010,
A10 = 6.5686e−013, A12 = 0.0000e+000

16th surface k = 0.0000
A4 = 2.5070e−005, A6 = −3.9727e−010, A8 = 9.4425e−012,
A10 = 1.7328e−013, A12 = 0.0000e+000

22th surface k = 0.0000
A4 = 2.9759e−006, A6 = 2.0483e−009, A8 = 4.8773e−011,
A10 = 0.0000e+000, A12 = 0.0000e+000

25th surface k = 0.0000
A4 = 3.9357e−006, A6 = −4.0017e−009, A8 = 3.9089e−012,
A10 = 4.0839e−013, A12 = 1.8703e−015

-continued

Unit mm

26th surface k = 0.0000
A4 = 3.8081e−005, A6 = −4.7568e−008, A8 = 3.6695e−011,
A10 = 1.1185e−012, A12 = 0.0000e+000

Zoom data

|  | WE | ST | TE |
|---|---|---|---|
| f | 12.240 | 33.982 | 97.938 |
| Fno. | 4.080 | 4.077 | 4.074 |
| 2ω | 83.0 | 34.4 | 12.3 |
| IH | 9.80 | 10.82 | 10.82 |
| FB | 15.363 | 15.363 | 15.363 |
| Lens total length | 138.219 | 150.439 | 183.459 |
| d5 | 0.700 | 22.674 | 48.654 |
| d11 | 3.974 | 4.357 | 6.163 |
| d13 | 21.681 | 9.403 | 2.333 |
| d14 | 15.967 | 5.000 | 1.300 |
| d21 | 0.900 | 14.007 | 30.011 |

Unit focal length

| f1 = 104.955 | f2 = −12.754 | f3 = 23.821 | f4 = 267.102 |
|---|---|---|---|
| f2a = −35.138 | f2b = −38.194 | $f_{IS}$ = −32.142 | $f_{GSb}$ = 40.890 |

Example 4

Unit mm

Surface data

| Surface no. | r | d | nd | νd |
|---|---|---|---|---|
| 1 | 69.248 | 1.800 | 2.00330 | 28.27 |
| 2 | 52.789 | 7.500 | 1.53775 | 74.70 |
| 3 | 200.000 | 0.100 |  |  |
| 4 | 57.884 | 5.214 | 1.53775 | 74.70 |
| 5 | 170.000 | Variable |  |  |
| 6* | 119.294 | 1.400 | 1.88202 | 37.22 |
| 7* | 12.115 | 8.000 |  |  |
| 8 | −29.183 | 1.100 | 1.59282 | 68.63 |
| 9 | 461.667 | 0.100 |  |  |
| 10 | 43.964 | 3.909 | 1.85478 | 24.80 |
| 11 | −38.517 | Variable |  |  |
| 12* | −21.000 | 0.900 | 1.53775 | 74.70 |
| 13* | 436.011 | Variable |  |  |
| 14(Stop) | ∞ | Variable |  |  |
| 15* | 20.000 | 6.196 | 1.59201 | 67.02 |
| 16* | −34.217 | 0.100 |  |  |
| 17 | 122.976 | 6.064 | 1.53775 | 74.70 |
| 18 | −42.576 | 0.100 |  |  |
| 19 | −80.617 | 0.800 | 1.91082 | 35.25 |
| 20 | 16.371 | 8.248 | 1.48749 | 70.23 |
| 21* | −24.000 | Variable |  |  |
| 22* | −303.081 | 0.800 | 1.76802 | 49.24 |
| 23 | 15.847 | 2.100 | 1.80810 | 22.76 |
| 24 | 26.006 | 13.081 |  |  |
| 25* | 22.916 | 9.800 | 1.49700 | 81.54 |
| 26* | −22.681 | 0.701 |  |  |
| 27 | −32.933 | 1.523 | 1.91082 | 35.25 |
| 28 | −107.492 |  |  |  |

Aspherical surface data

6th surface k = 0.0000
A4 = −7.0773e−006, A6 = 7.8081e−009, A8 = 1.9471e−010,
A10 = −1.2393e−012, A12 = 2.4350e−015

7th surface k = 0.0000
A4 = −4.3159e−005, A6 = −2.2982e−008, A8 = −4.7731e−009,
A10 = 5.0846e−011, A12 = −2.9867e−013
12th surface
k = 0.0000
A4 = 1.2716e−005, A6 = 1.0413e−007, A8 = 3.1045e−010,
A10 = −1.6671e−011, A12 = 1.4128e−013
13th surface
k = 0.0000
A4 = 1.1189e−006, A6 = 1.0070e−007, A8 = −6.7178e−010,
A10 = −4.0044e−012, A12 = 5.8055e−014
15th surface
k = 0.0000
A4 = −2.7500e−005, A6 = 4.1983e−008, A8 = −2.3500e−010,
A10 = 6.5686e−013, A12 = 0.0000e+000
16th surface
k = 0.0000
A4 = 2.5070e−005, A6 = −3.9727e−010, A8 = 9.4425e−012,
A10 = 1.7328e−013, A12=0.0000e+000
21th surface
k = 0.0000
A4 = 3.0000e−006, A6 = 0.0000e+000, A8 = 0.0000e+000,
A10 = 0.0000e+000, A12 = 0.0000e+000
22th surface
k = 0.0000
A4 = 2.9759e−006, A6 = 2.0483e−009, A8 = 4.8773e−011,
A10 = 0.0000e+000, A12 = 0.0000e+000
25th surface
k = 0.0000
A4 = 3.9357e−006, A6 = −4.0017e−009, A8 = 3.9089e−012,
A10 = 4.0839e−013, A12 = 1.8703e−015
26th surface
k = 0.0000
A4 = 3.8081e−005, A6 = −4.7568e−008, A8 = 3.6695e−011,
A10 = 1.1185e−012, A12 = 0.0000e+000

Zoom data

|  | WE | ST | TE |
|---|---|---|---|
| f | 11.865 | 32.579 | 92.797 |
| Fno. | 4.100 | 4.100 | 4.100 |
| 2ω | 86.0 | 36.1 | 13.0 |
| IH | 9.80 | 10.82 | 10.82 |
| FB | 14.623 | 14.623 | 14.623 |
| Lens total length | 137.480 | 149.465 | 183.361 |
| d5 | 0.700 | 22.674 | 48.654 |
| d11 | 3.974 | 4.357 | 6.163 |
| d13 | 21.681 | 9.403 | 2.333 |
| d14 | 15.967 | 5.000 | 1.300 |
| d21 | 0.900 | 13.772 | 30.652 |

Unit focal length

| f1 = 108.594 | f2 = −12.548 | f3 = 23.547 | f4 = 267.102 |
|---|---|---|---|
| f2a = −35.138 | f2b = −37.232 | $f_{IS}$ = −32.142 | $f_{GSb}$ = 40.890 |

Aberration diagrams of the examples from the example 1 to the example 4 are shown in diagrams from FIG. 5A, FIG. 5B, FIG. 5C, FIG. 5D, FIG. 5E, FIG. 5F, FIG. 5G, FIG. 5H, FIG. 5I, FIG. 5J, FIG. 5K, and FIG. 5L to FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L, respectively. In these aberration diagrams, 'FIY' denotes the maximum image height.

FIG. 5A, FIG. 6A, FIG. 7A, and FIG. 8A show a spherical aberration (SA) at the wide angle end. FIG. 5B, FIG. 6B, FIG. 7B, and FIG. 8B show an astigmatism (AS) at the wide angle end. FIG. 5C, FIG. 6C, FIG. 7C, and FIG. 8C show a distortion (DT) at the wide angle end. FIG. 5D, FIG. 6D, FIG. 7D, and FIG. 8D show a chromatic aberration of magnification (CC) at the wide angle end.

FIG. 5E, FIG. 6E, FIG. 7E, and FIG. 8E show a spherical aberration (SA) in the intermediate focal length state. FIG. 5F, FIG. 6F, FIG. 7F, and FIG. 8F show an astigmatism (AS) in the intermediate focal length state. FIG. 5G, FIG. 6G, FIG. 7G, and FIG. 8G show a distortion (DT) in the intermediate focal length state. FIG. 5H, FIG. 6H, FIG. 7H, and FIG. 8H show a chromatic aberration of magnification (CC) in the intermediate focal length state.

FIG. 5I, FIG. 6I, FIG. 7I, and FIG. 8I show a spherical aberration (SA) at the telephoto end. FIG. 5J, FIG. 6J, FIG. 7J, and FIG. 8J show an astigmatism (AS) at the telephoto end. FIG. 5K, FIG. 6K, FIG. 7K, and FIG. 8K show a distortion (DT) at the telephoto end. FIG. 5L, FIG. 6L, FIG. 7L, and FIG. 8L show a chromatic aberration of magnification (CC) at the telephoto end.

Next, values of conditional expressions (1) to (18) in each example are given below.

| Conditional expression | Example 1 | Example 2 | Example 3 | Example 4 |
|---|---|---|---|---|
| (1) $|f_1/f_3|$ | 6.42 | 5.69 | 4.41 | 4.61 |
| (2) $|f_1/f_{2t}|$ | 9.27 | 9.50 | 8.23 | 8.66 |
| (3) $|f_{IS}/f_{GSb}|$ | 0.822 | 0.760 | 0.786 | 0.786 |
| (4) $vd_{4G\_max\_n} - vd_{4G\_min\_p}$ | 18.16 | 18.16 | — | — |
| (5) $nd_{2G\_n1}$ | 1.88202 | 1.88202 | 1.88202 | 1.88202 |
| (6) $vd_{1G\_max\_p}$ | 81.54 | 81.54 | 81.61 | 74.7 |
| (7) $vd_{3G\_max\_p}$ | 81.54 | 81.54 | 81.61 | 74.7 |
| (8) $d_{IS}/IH_t$ | 0.15 | 0.13 | 1.21 | 1.21 |
| (9) $f_t/exp_t$ | −0.462 | −0.538 | −0.482 | −0.4487 |
| (10) $Tp_{2G\_min\_p}$ | 0.012736 | 0.004508 | 0.01038 | 0.01038 |
| (11) $Tp_{2G\_max\_n}$ | 0.000984 | −0.009252 | 0.027876 | 0.01722 |
| (12) $vd_{2G\_max\_n}$ | 41.24 | 55.53 | 81.54 | 74.7 |
| (13) $vd_{G2\_min\_p}$ | 25.46 | 29.13 | 24.8 | 24.8 |
| (14) $vd_{3G\_max\_p}$ | 81.54 | 81.54 | 81.61 | 74.7 |
| (15) $|\Phi_{maxt}/f_{2t}|$ | 1.46 | 1.99 | 1.88 | 1.8037 |
| (16) $|f_3/f_4|$ | 0.76 | 0.70 | 0.09 | 0.09 |
| (17) $|f_4/f_5|$ | 0.56 | 0.57 | — | — |
| (18) $|f_{2a}/f_{2b}|$ | — | — | 0.92 | 0.94 |

Figure 9:
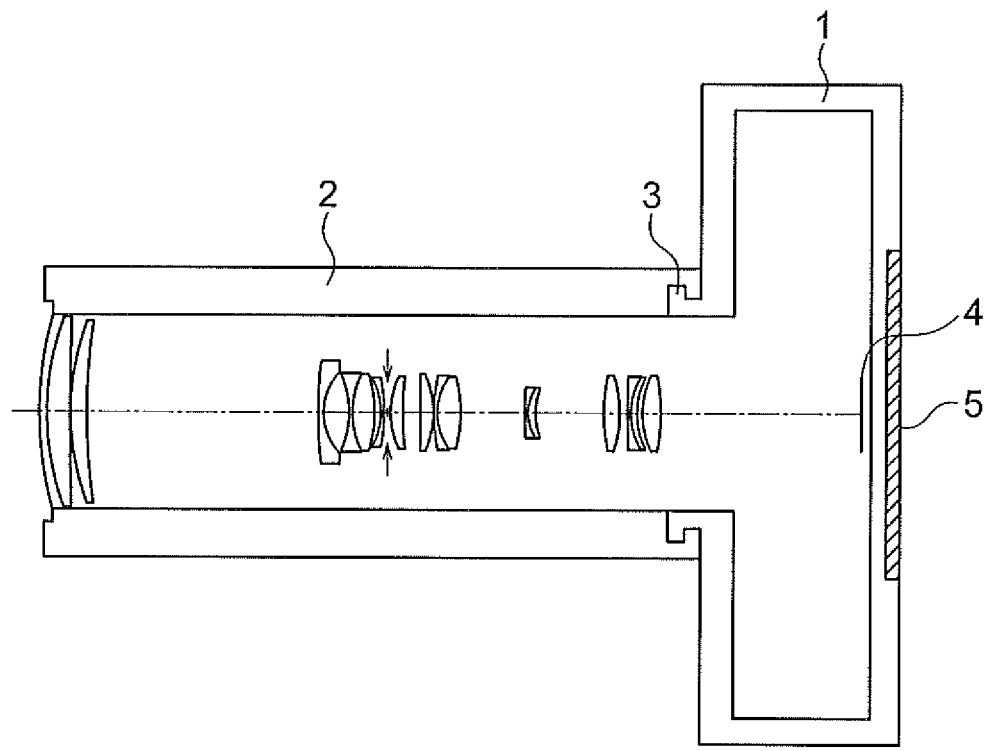
FIG. 9 is a cross-sectional view of an image pickup apparatus.

FIG. 9 is a cross-sectional view of a single-lens mirrorless camera as an electronic image pickup apparatus. In FIG. 9, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the zoom lens described in any one of the examples from the first example to the fourth example is to be used.

Figure 10:
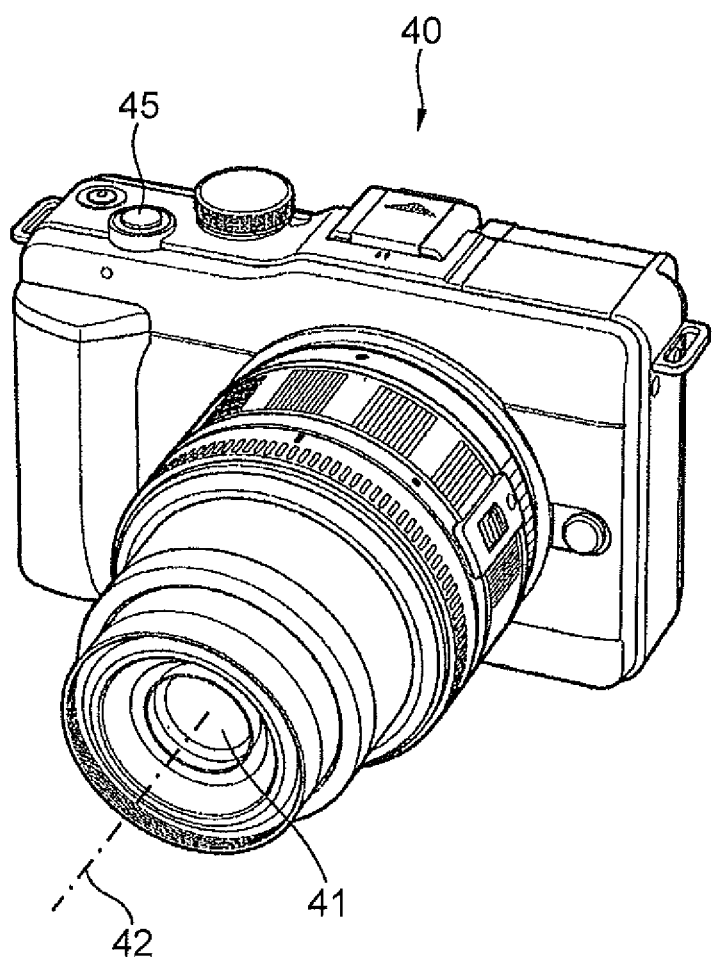
FIG. 10 is a front perspective view showing an appearance of the image pickup apparatus.
Figure 11:
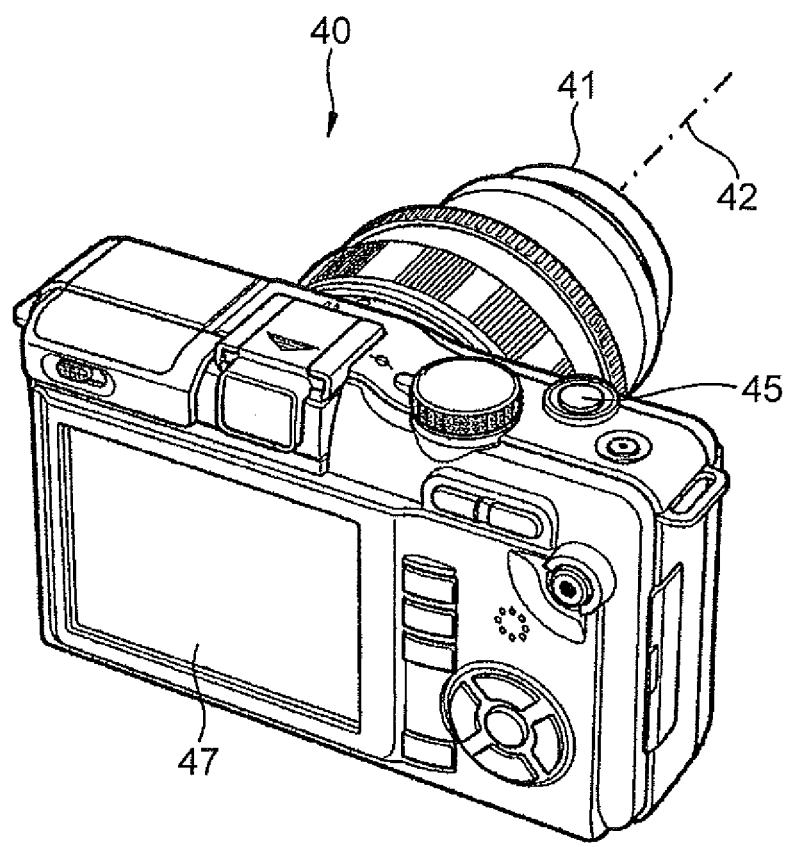
FIG. 11 is a rear perspective view of the image pickup apparatus.

FIG. 10 and FIG. 11 are conceptual diagrams of an arrangement of the image pickup apparatus. FIG. 10 is a front perspective view of a digital camera 40 as the image pickup apparatus, and FIG. 11 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 12:
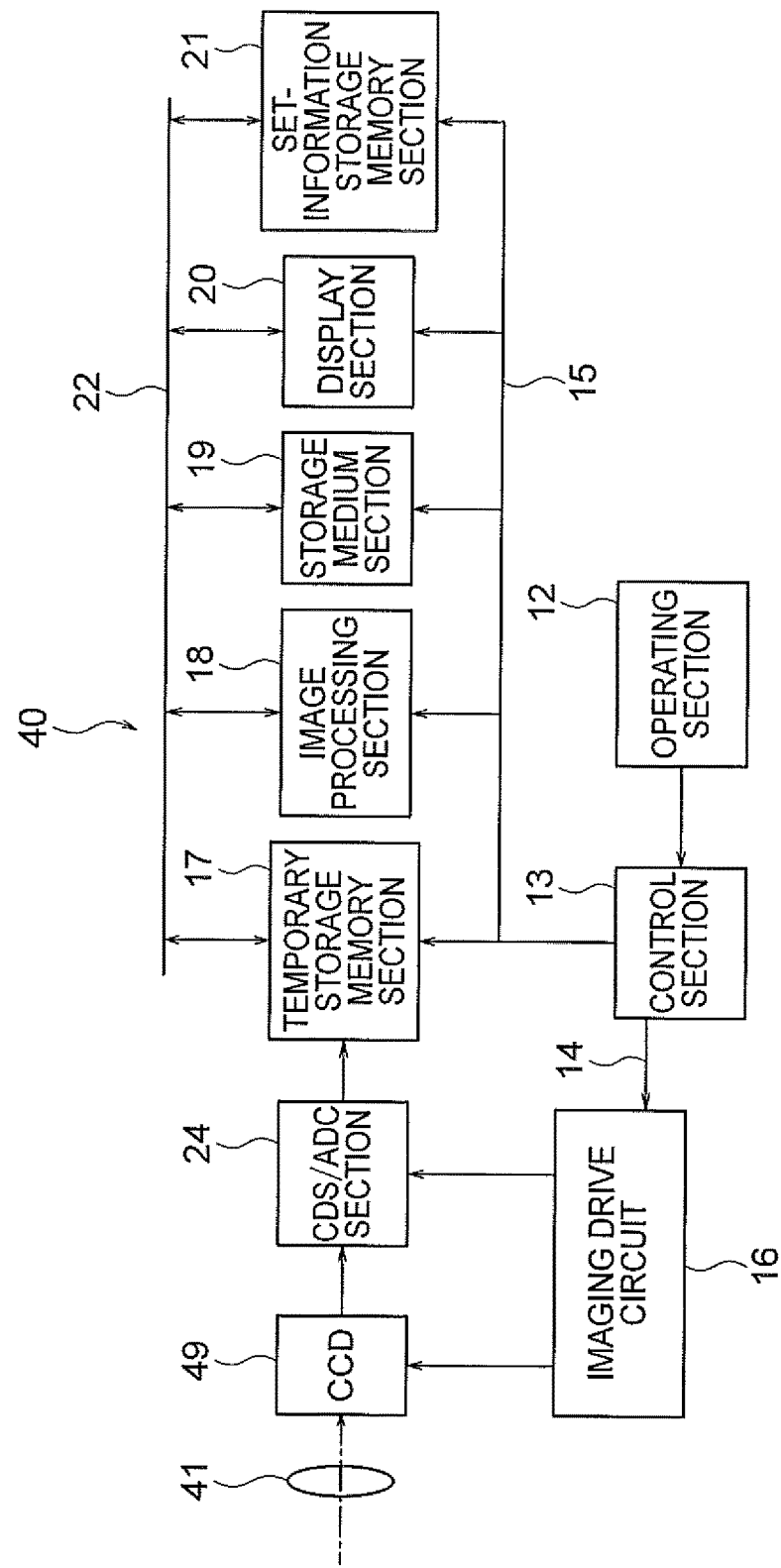
FIG. 12 is a structural block diagram of an internal circuit of main sections of the image pickup apparatus.

FIG. 12 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 12, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By using the zoom lens according to the example as the photographic optical system 41, it is possible to obtain an image for which, an angle of view on a wide angle side and a range of an angle of view that can be photographed are wide, and an noise is less.

The present invention can have various modified examples without departing from the scope of the invention. Moreover, shapes of lenses and the number of lenses are not necessarily restricted to the shapes and the number of lenses indicated in the examples. A lens that is not shown in the diagrams of the examples described above, and that does not have a refractive power practically may be disposed in a lens unit or outside the lens unit. In each of the examples described above, it is possible to make an arrangement such that the zoom lens includes four lens units practically.

According the present embodiment of the present invention, it is possible to provide a zoom lens in which various aberrations are corrected favorably and reduction of degradation of the image due to the camera shake and an improvement in accuracy of image-blur correction is facilitated, and an image pickup apparatus using such zoom lens.

As described heretofore, the embodiment according to the present invention is suitable for a zoom lens in which, various aberrations are corrected favorably and reduction of degradation of the image due to the camera shake and an improvement in accuracy of image-blur correction is facilitated without a mobility being lost at the time of photographing and carrying, while having a wide angle of view and a high zoom ratio, and an image pickup apparatus using such zoom lens.

What is claimed is:

1. A zoom lens comprising in order from an object side:
a first lens unit having a positive refractive power;
a second lens unit having a negative refractive power;
a third lens unit having a positive refractive power; and
a predetermined lens unit which is disposed on an image side of the third lens unit, wherein
a distance between the first lens unit and the second lens unit changes to become wider at a telephoto end than the distance at a wide angle end, and
a distance between the second lens unit and the third lens unit changes to become narrower at the telephoto end than the distance at the wide angle end, and
an aperture stop is disposed on the image side of the second lens unit, and
the predetermined lens unit includes a first lens component which is fixed on an optical axis at the time of zooming and a second lens component which is fixed on the optical axis at the time of zooming, and
the first lens component moves perpendicularly with respect to the optical axis, for correcting a blur, and
the second lens component is disposed, leaving an air space on the image side of the first lens component, and
a sign of a refractive power of the second lens component differs from a sign of a refractive power of the first lens component, and
the following conditional expression (1) is satisfied;

$$3.4 \leq |f_1/f_3| \leq 9 \tag{1}$$

where,
$f_1$ denotes a focal length of the first lens unit, and
$f_3$ denotes a focal length of the third lens unit.

2. A zoom lens comprising in order from an object side:
a first lens unit having a positive refractive power;
a second lens unit having a negative refractive power;
a third lens unit having a positive refractive power; and
a predetermined lens unit which is disposed on an image side of the third lens unit, wherein
a distance between the first lens unit and the second lens unit changes to become wider at a telephoto end than the distance at a wide angle end, and
a distance between the second lens unit and the third lens unit changes to become narrower at the telephoto end than the distance at the wide angle end, and
an aperture stop is disposed on the image side of the second lens unit, and
the predetermined lens unit includes a first lens component which is fixed on an optical axis at the time of zooming and a second lens component which is fixed on the optical axis at the time of zooming, and
the first lens component moves perpendicularly with respect to the optical axis, for correcting a blur, and
the second lens component is disposed, leaving an air space on the image side of the first lens component, and
a sign of a refractive power of the second lens component differs from a sign of a refractive power of the first lens component, and
the first lens component includes at least a positive lens and a negative lens, and
the third lens unit, at the time of zooming from the wide angle end to the telephoto end, moves monotonically toward the object side.

3. A zoom lens comprising in order from an object side:
a first lens unit having a positive refractive power;
a second lens unit having a negative refractive power;
a third lens unit having a positive refractive power; and
a predetermined lens unit which is disposed on an image side of the third lens unit, wherein
a distance between the first lens unit and the second lens unit changes to become wider at a telephoto end than the distance at a wide angle end, and
a distance between the second lens unit and the third lens unit changes to become narrower at the telephoto end than the distance at the wide angle end, and
an aperture stop is disposed on the image side of the second lens unit, and
the predetermined lens unit includes a first lens component which is fixed on an optical axis at the time of zooming and a second lens component which is fixed on the optical axis at the time of zooming, and the first lens component moves perpendicularly with respect to the optical axis, for correcting a blur, and the second lens component is disposed, leaving an air space on the image side of the first lens component, and a sign of a refractive power of the second lens component differs from a sign of a refractive power of the first lens component, and the first lens component includes at least a positive lens and a negative lens, and the second lens component is disposed in the predetermined lens unit, and the following conditional expressions (2) and (3) are satisfied;

$$5.3 \leq |f_1/f_{2t}| \leq 20 \quad (2)$$

$$0.3 \leq |f_{IS}/f_{GSb}| \leq 4.7 \quad (3)$$

where, $f_1$ denotes a focal length of the first lens unit, $f_{2t}$ denotes a focal length at the telephoto end of the second lens unit, $f_{IS}$ denotes a focal length of the first lens component, and $f_{GSb}$ denotes a focal length of the second lens component.

4. A zoom lens comprising in order from an object side:
a first lens unit having a positive refractive power;
a second lens unit having a negative refractive power;
a third lens unit having a positive refractive power; and
a predetermined lens unit which is disposed on an image side of the third lens unit, wherein
a distance between the first lens unit and the second lens unit changes to become wider at a telephoto end than the distance at a wide angle end, and
a distance between the second lens unit and the third lens unit changes to become narrower at the telephoto end than the distance at the wide angle end, and
an aperture stop is disposed on the image side of the second lens unit, and
the predetermined lens unit includes a first lens component which is fixed on an optical axis at the time of zooming and a second lens component which is fixed on the optical axis at the time of zooming, and
the first lens component moves perpendicularly with respect to the optical axis, for correcting a blur, and
the second lens component is disposed, leaving an air space on the image side of the first lens component, and
a sign of a refractive power of the second lens component differs from a sign of a refractive power of the first lens component, and
the first lens component has a negative refractive power, and
the second lens component is disposed in the predetermined lens unit, and
the following conditional expressions (2) and (3) are satisfied;

$$5.3 \leq |f_1/f_{2t}| \leq 20 \quad (2)$$

$$0.3 \leq |f_{IS}/f_{GSb}| \leq 4.7 \quad (3)$$

where, $f_1$ denotes a focal length of the first lens unit, $f_{2t}$ denotes a focal length at the telephoto end of the second lens unit, $f_{IS}$ denotes a focal length of the first lens component, and $f_{GSb}$ denotes a focal length of the second lens component.

5. The zoom lens according to claim 1, wherein the predetermined lens unit is fixed at the time of zooming.

6. The zoom lens according to claim 2, wherein the predetermined lens unit is fixed at the time of zooming.

7. The zoom lens according to claim 3, wherein the predetermined lens unit is fixed at the time of zooming.

8. The zoom lens according to claim 4, wherein the predetermined lens unit is fixed at the time of zooming.

9. The zoom lens according to claim 2, wherein the following conditional expression (1) is satisfied;

$$3.4 \leq |f_1/f_3| \leq 9 \quad (1)$$

where, $f_1$ denotes a focal length of the first lens unit, and $f_3$ denotes a focal length of the third lens unit.

10. The zoom lens according to claim 3, wherein the following conditional expression (1) is satisfied;

$$3.4 \leq |f_1/f_3| \leq 9 \quad (1)$$

where, $f_1$ denotes a focal length of the first lens unit, and $f_3$ denotes a focal length of the third lens unit.

11. The zoom lens according to claim 1, wherein the third lens unit, at the time of zooming from the wide angle end to the telephoto end, moves monotonically toward the object side.

12. The zoom lens according to claim 3, wherein the third lens unit, at the time of zooming from the wide angle end to the telephoto end, moves monotonically toward the object side.

13. The zoom lens according to claim 1, wherein the following conditional expression (2) is satisfied;

$$5.3 \leq |f_1/f_{2t}| \leq 20 \quad (2)$$

$f_1$ denotes the focal length of the first lens unit, and $f_{2t}$ denotes a focal length at the telephoto end of the second lens unit.

14. The zoom lens according to claim 2, wherein the following conditional expression (2) is satisfied;

$$5.3 \leq |f_1/f_{2t}| \leq 20 \quad (2)$$

$f_1$ denotes the focal length of the first lens unit, and $f_{2t}$ denotes a focal length at the telephoto end of the second lens unit.

15. The zoom lens according to claim 1, wherein the following conditional expression (3) is satisfied;

$$0.3 \leq |f_{IS}/f_{GSb}| \leq 4.7 \quad (3)$$

where, $f_{IS}$ denotes a focal length of the first lens component, and $f_{GSb}$ denotes a focal length of the second lens component.

16. The zoom lens according to claim 2, wherein the following conditional expression (3) is satisfied;

$$0.3 \leq |f_{IS}/f_{GSb}| \leq 4.7 \quad (3)$$

where, $f_{IS}$ denotes a focal length of the first lens component, and $f_{GSb}$ denotes a focal length of the second lens component.

17. The zoom lens according to claim 1, wherein the first lens unit is positioned on the object side at the telephoto end than at the wide angle end.

18. A zoom lens comprising in order from an object side:
a first lens unit having a positive refractive power;
a second lens unit having a negative refractive power;
a third lens unit having a positive refractive power; and
a predetermined lens unit which is disposed on an image side of the third lens unit, wherein
a distance between the first lens unit and the second lens unit changes to become wider at a telephoto end than the distance at a wide angle end, and a distance between the second lens unit and the third lens unit changes to become narrower at the telephoto end than the distance at the wide angle end, and an aperture stop is disposed on the image side of the second lens unit, and the predetermined lens unit includes a first lens component which is fixed at the time of zooming, and the first lens component moves perpendicularly with respect to an optical axis, for correcting a blur, and a second lens component is disposed, leaving an air space on the image side of the first lens component, and a sign of a refractive power of the second lens component differs from a sign of a refractive power of the first lens component, and the following conditional expression (1) is satisfied;

$$3.4 \leq |f_1/f_3| \leq 9 \qquad (1)$$

where, $f_1$ denotes a focal length of the first lens unit, and $f_3$ denotes a focal length of the third lens unit, and a lens unit having a negative refractive power is disposed between the third lens unit and the predetermined lens unit, and a positive lens component is disposed on the image side of the lens unit having a negative refractive power.

19. A zoom lens comprising in order from an object side:

a first lens unit having a positive refractive power;

a second lens unit having a negative refractive power;

a third lens unit having a positive refractive power; and a predetermined lens unit which is disposed on an image side of the third lens unit, wherein a distance between the first lens unit and the second lens unit changes to become wider at a telephoto end than the distance at a wide angle end, and a distance between the second lens unit and the third lens unit changes to become narrower at the telephoto end than the distance at the wide angle end, and an aperture stop is disposed on the image side of the second lens unit, and the predetermined lens unit includes a first lens component which is fixed at the time of zooming, and the first lens component moves perpendicularly with respect to an optical axis, for correcting a blur, and a second lens component is disposed, leaving an air space on the image side of the first lens component, and a sign of a refractive power of the second lens component differs from a sign of a refractive power of the first lens component, and the following conditional expression (1) is satisfied;

$$3.4 \leq |f_1/f_3| \leq 9 \qquad (1)$$

where, $f_1$ denotes a focal length of the first lens unit, and $f_3$ denotes a focal length of the third lens unit, and a lens unit having a negative refractive power is disposed between the third lens unit and the predetermined lens unit, and the lens unit having a negative refractive power includes a focusing lens unit.

20. The zoom lens according to claim 1, wherein a fourth lens unit having a negative refractive power is disposed between the third lens unit and the predetermined lens unit, and the fourth lens unit includes a negative lens and a positive lens, and the predetermined lens unit is a fifth lens unit having a positive refractive power, and the following conditional expression (4) is satisfied:

$$6.0 \leq vd_{4G\_max\_n} - vd_{4G\_min\_p} \leq 45 \qquad (4)$$

where, $vd_{4G\_max\_n}$ denotes the maximum Abbe's number from among Abbe's numbers for negative lenses in the fourth lens unit, and $vd_{4G\_min\_p}$ denotes the minimum Abbe's number from among Abbe's numbers for positive lenses in the fourth lens unit.

21. The zoom lens according to claim 1, wherein the second lens unit comprises in order from the object side to the image side, a negative lens having an image-side surface which is a concave surface directed toward the image side, a negative lens, and a positive lens having an image-side surface which is a convex surface directed toward the image side.

22. The zoom lens according to claim 17, wherein the second lens unit comprises, a first sub-unit having a negative refractive power and a second sub-unit having a negative refractive power, and the second sub-unit includes a focusing lens unit.

23. The zoom lens according to claim 1, wherein the second lens unit comprises a first sub-unit and a second sub-unit, and the first sub-unit includes in order from the object side to the image side, a negative lens having an image-side surface which is a concave surface directed toward the image side, a negative lens, and a positive lens having an image-side surface which is a convex surface directed toward the image side.

24. The zoom lens according to claim 19, wherein in the second lens unit, a negative lens having a concave surface directed toward the image side is disposed nearest to an object, and in the negative lens which is nearest to the object, an absolute value of a radius of curvature of an image-side surface is smaller as compared to an absolute value of a radius of curvature of an object-side surface, and the following conditional expression (5) is satisfied;

$$1.78 \leq nd_{2G\_n1} \leq 2.3 \qquad (5)$$

where, $nd_{2G\_n1}$ denotes a refractive index of the negative lens nearest to the object in the second lens unit.

25. The zoom lens according to claim 1, wherein the second lens unit comprises a first sub-unit and a second sub-unit, and at the time of zooming, a distance between the first sub-unit and the second sub-unit changes.

26. The zoom lens according to claim 1, wherein the first lens unit includes at least one negative lens and two positive lenses.

27. The zoom lens according to claim 1, wherein the first lens unit includes at least a negative lens and a positive lens, and the following conditional expression (6) is satisfied;

$$70.5 \leq vd_{1G\_max\_p} \qquad (6)$$

where, $vd_{1G\_max\_p}$ denotes the maximum Abbe's number from among Abbe's numbers for positive lenses in the first lens unit.

28. The zoom lens according to claim 1, wherein the third lens unit includes at least a negative lens and a positive lens, and the following conditional expression (7) is satisfied;

$$70.5 \leq vd_{3G\_max\_p} \qquad (7)$$

where, $vd_{3G\_max\_p}$ denotes the maximum Abbe's number from among Abbe's numbers for positive lenses in the third lens unit.

29. The zoom lens according to claim 1, wherein the first lens component has a negative refractive power.

30. The zoom lens according to claim 1, wherein the predetermined lens unit is disposed nearest to an image.

31. The zoom lens according to claim 1, wherein the first lens component includes at least a positive lens and a negative lens.

32. The zoom lens according to claim 1, wherein the following conditional expression (8) is satisfied;

$$0.03 \leq d_{IS}/IH_t \quad (8)$$

where, $d_{IS}$ denotes a distance on an optical axis between a surface nearest to an image of the first lens component and a surface nearest to an object of the second lens component, and $IH_t$ denotes an image height at the telephoto end.

33. The zoom lens according to claim 1, wherein the aperture stop is disposed on the object side of the predetermined lens unit.

34. The zoom lens according to claim 1, wherein the third lens unit includes at least two lens components having a positive refractive power.

35. The zoom lens according to claim 1, wherein the following conditional expression (9) is satisfied;

$$-2.5 \leq f_t/\exp_t \leq 0.3 \quad (9)$$

where, $f_t$ denotes a focal length of the overall zoom lens system at the telephoto end, and $\exp_t$ denotes a distance from a paraxial image forming surface up to an exit pupil of the zoom lens at the telephoto end.

36. The zoom lens according to claim 1, wherein
the second lens unit includes a positive lens, and
the following conditional expression (10) is satisfied;

$$-0.015 \leq Tp_{2G\_min\_p} \leq 0.015 \quad (10)$$

where, $Tp_{2G\_min\_p} = \theta gF_{2G\_p} - (-0.0016 \times vd_{2G\_p} + 0.6415)$, $\theta gF_{2G\_p} = (ng_{2G\_p} - nF_{2G\_p})/(nF_{2G\_p} - nC_{2G\_p})$, $vd_{2G\_p}$ denotes Abbe's number for a predetermined positive lens in the second lens unit, each of $ng_{2G\_p}$, $nF_{2G\_p}$, and $nC_{2G\_p}$ denotes a refractive index of the predetermined positive lens in the second lens unit, for a g-line, an F-line, and a C-line respectively, and the predetermined positive lens in the second lens unit is a positive lens for which Abbe's number is the smallest, from among positive lenses in the second lens unit.

37. The zoom lens according to claim 1, wherein
the second lens unit includes a negative lens, and
the following conditional expression (11) is satisfied;

$$-0.012 \leq Tp_{2G\_max\_n} \leq 0.06 \quad (11)$$

where, $Tp_{2G\_max\_n} = \theta gF_{2G\_n} - (-0.0016 \times vd_{2G\_n} + 0.6415)$ $\theta gF_{2G\_n} = (ng_{2G\_n} - nF_{2G\_n})/(nF_{2G\_n} - nC_{2G\_n})$ $vd_{2G\_n}$ denotes Abbe's number for a predetermined negative lens in the second lens unit, each of $ng_{2G\_n}$, $nF_{2G\_n}$, and $nC_{2G\_n}$ denotes a refractive index of the predetermined negative lens in the second lens unit, for a g-line, an F-line, and a C-line respectively, and the predetermined negative lens in the second lens unit is a negative lens for which Abbe's number is the largest, from among negative lenses in the second lens unit.

38. The zoom lens according to claim 1, wherein
the second lens unit includes at least a negative lens and a positive lens, and
the following conditional expression (12) is satisfied;

$$55 \leq vd_{2G\_max\_n} \quad (12)$$

where, $vd_{2G\_max\_n}$ denotes the maximum Abbe's number from among Abbe's numbers for negative lenses in the second lens unit.

39. The zoom lens according to claim 1, wherein
the second lens unit includes at least a negative lens and a positive lens, and
the following conditional expression (13) is satisfied;

$$15 \leq vd_{G2\_min\_p} \leq 32 \quad (13)$$

where, $vd_{G2\_min\_p}$ denotes the minimum Abbe's number from among Abbe's numbers for positive lenses in the second lens unit.

40. The zoom lens according to claim 1, wherein
the third lens unit includes at least a negative lens and a positive lens, and
the following conditional expression (14) is satisfied;

$$70.5 \leq vd_{3G\_max\_p} \quad (14)$$

where, $vd_{3G\_max\_p}$ denotes the maximum Abbe's number from among Abbe's numbers for positive lenses in the third lens unit.

41. The zoom lens according to claim 1, wherein the following conditional expression (15) is satisfied;

$$1.05 \leq |\Phi_{maxt}/f_{2t}| \leq 3.0 \quad (15)$$

where, $\Phi_{maxt}$ denotes the maximum diameter of an entrance pupil at the telephoto end, and is expressed by $\Phi_{maxt} = f_t/Fno_t$, $f_t$ denotes a focal length of the overall zoom lens system at the telephoto end, $Fno_t$ denotes the smallest F-number at the telephoto end, and $f_{2t}$ denotes a focal length at the telephoto end of the second lens unit.

42. The zoom lens according to claim 1, wherein
the first lens component has a negative refractive power, and
a lens component having a positive refractive power, which is fixed at the time of zooming, is disposed at a position on the object side, nearest to the first lens component.

43. The zoom lens according to claim 1, wherein
the first lens component has a negative refractive power, and
a lens unit having a positive refractive power is disposed at a position on the object side, nearest to the first lens component.

44. The zoom lens according to claim 1, comprising:
a fourth lens unit, wherein
the following conditional expression (16) is satisfied;

$$0.00<|f_3/f_4|<2.00 \qquad (16)$$

where,
$f_3$ denotes the focal length of the third lens unit, and
$f_4$ denotes a focal length of the fourth lens unit.

45. The zoom lens according to claim 1, comprising:
a fourth lens unit, wherein
the predetermined lens unit is a fifth lens unit, and
the following conditional expression (17) is satisfied;

$$0.00<|f_4/f_5|<2.00 \qquad (17)$$

where,
$f_4$ denotes a focal length of the fourth lens unit, and
$f_5$ denotes a focal length of the fifth lens unit.

46. The zoom lens according to claim 1, wherein
the second lens unit comprises a first sub-unit and a second sub-unit, and
the following conditional expression (18) is satisfied;

$$0.00<|f_{2a}/f_{2b}|<2.00 \qquad (18)$$

where,
$f_{2a}$ denotes a focal length of the first sub-unit, and
$f_{2b}$ denotes a focal length of the second sub-unit.

47. The zoom lens according to claim 1, wherein the first lens unit comprises in order from the object side to the image side, a negative meniscus lens having a convex surface directed toward the object side, a positive meniscus lens having a convex surface directed toward the object side, and a positive meniscus lens having a convex surface directed toward the object side.

48. The zoom lens according to claim 1, wherein the second lens unit comprises in order from the object side to the image side, a negative lens, a negative lens, a positive lens, and a negative lens.

49. The zoom lens according to claim 1, wherein a negative meniscus lens having a convex surface directed toward the object side is disposed nearest to the object in the second lens unit.

50. The zoom lens according to claim 1, wherein the second lens unit includes in order from the object side to the image side, a negative meniscus lens having a convex surface directed toward the object side, a biconcave negative lens, a biconvex positive lens, and a negative lens having an object-side surface which is a concave surface directed toward the object side.

51. The zoom lens according to claim 1, wherein the third lens unit includes in order from the object side to the image side, a positive lens, a positive lens, a negative lens, and a positive lens.

52. The zoom lens according to claim 1, wherein both of a lens disposed nearest to an object in the third lens unit and a lens disposed nearest to an image in the third lens unit are biconvex positive lenses.

53. The zoom lens according to claim 1, wherein the third lens unit includes in order from the object side to the image side, a biconvex positive lens, a positive lens having an image-side surface which is a convex surface directed toward the image side, a negative lens having an image-side surface which is a concave surface directed toward the image side, and a biconvex positive lens.

54. An image pickup apparatus comprising:
the zoom lenses according to claim 1, and
an image pickup element which has an image pickup surface.

* * * * *